United States Patent
Yamamoto et al.

(10) Patent No.: US 7,257,262 B2
(45) Date of Patent: Aug. 14, 2007

(54) MOVING IMAGE CODING METHOD AND APPARATUS FOR DETERMINING A POSITION OF A MACRO BLOCK WHICH IS INTRA-CODED OR INTER-CODED

(75) Inventors: Takahiro Yamamoto, Takatsuki (JP); Mitsuya Nakahara, Ibaraki (JP); Kazuyuki Inokuma, Yawata (JP); Shinji Kitamura, Nagaokakyou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 785 days.

(21) Appl. No.: 10/644,854

(22) Filed: Aug. 21, 2003

(65) Prior Publication Data

US 2004/0175049 A1 Sep. 9, 2004

(30) Foreign Application Priority Data

Mar. 4, 2003 (JP) ............................ P2003-057199

(51) Int. Cl.
*G06K 9/36* (2006.01)
*G06K 9/00* (2006.01)
(52) U.S. Cl. .................................... 382/236
(58) Field of Classification Search ................ 382/232, 382/236, 238, 239, 248, 250; 375/240.03, 375/240.08, 240.16
See application file for complete search history.

(56) References Cited

U.S. PATENT DOCUMENTS

| | | | |
|---|---|---|---|
| 5,870,500 A * | 2/1999 | Daoudi et al. ............... | 382/236 |
| 6,115,070 A | 9/2000 | Song et al. | |
| 6,118,818 A | 9/2000 | Min et al. | |
| 6,134,269 A * | 10/2000 | Puri et al. ............... | 375/240.03 |
| 6,192,078 B1 * | 2/2001 | Komiya et al. ......... | 375/240.16 |
| 6,370,276 B2 * | 4/2002 | Boon ........................ | 382/238 |
| 6,542,545 B1 * | 4/2003 | Vetro et al. ............ | 375/240.08 |
| 6,782,132 B1 * | 8/2004 | Fogg .......................... | 382/232 |
| 7,116,831 B2 * | 10/2006 | Mukerjee et al. ........... | 382/236 |
| 2002/0176498 A1 | 11/2002 | Frojdh et al. | |

FOREIGN PATENT DOCUMENTS

| JP | 8-37663 A | 2/1996 |
|---|---|---|
| JP | 11-313327 | 11/1999 |
| JP | 2001-186523 A | 7/2001 |
| JP | 2002-112270 A | 4/2002 |

* cited by examiner

*Primary Examiner*—Amir Alavi
(74) *Attorney, Agent, or Firm*—McDermott Will & Emery LLP

(57) ABSTRACT

A memory controller controls so that the number of maximum macro blocks for which inter coding is performed in one image frame is set to a smaller value than the number of macro blocks configuring the image frame, the capacity of the reference image memory is reduced to capacity for the maximum macro blocks for which inter coding is performed, macro block positions for which intra coding and inter coding are performed in the next frame are determined based upon image information and the quantity of codes in the coding of a present image and reference image macro blocks equivalent to only macro block positions for which inter coding is determined to be performed in the next frame are stored in the reference image memory.

43 Claims, 30 Drawing Sheets

FIG. 8

(EXAMPLE 1)
JUDGE BASED UPON TOTAL QUANTITY  TOTAL QUANTITY CODES
CODES IN (N-2)th FRAME                          IN (N-2)th FRAME IS
                                                                  JUDGED MUCH

MACRO BLOCK        (N-2)th FRAME                         (N-1)th FRAME                         Nth FRAME
ADDRESS

| 1 | 2 | 3 | 4 |
|---|---|---|---|
| 5 | 6 | 7 | 8 |
| 9 |10 |11 |12 |
|13 |14 |15 |16 |

801                    802                                                   804                                              806

REFERENCE                           REFERENCE
                        IMAGE MEMORY                   IMAGE MEMORY
                        FOR (N-1)th FRAME              FOR Nth FRAME

⇒ AS IT IS                              ⇒ INVERSION
                            (USELESS)                              (CHANGE)

| 2 | 4 |           | 1 | 3 |
|---|---|           |---|---|
| 5 | 7 |           | 6 | 8 |
|10 |12 |           | 9 |11 |
|13 |15 |           |14 |16 |

803                                                          805

INTER CODING
QUANTITY IN
(N-1)th FRAME
IS JUDGED MUCH

MOVING IMAGE CODING METHOD AND APPARATUS FOR DETERMINING A POSITION OF A MACRO BLOCK WHICH IS INTRA-CODED OR INTER-CODED

BACKGROUND OF THE INVENTION

1. Field of the Invention

The present invention relates to moving image coding method and apparatus for executing the compression coding of a moving image by suitably switching intra coding which utilizes spatial redundancy in a frame and inter coding which utilizes temporal redundancy between frames.

2. Description of the Related Art

FIG. 30 is a block diagram showing an example of the configuration of a conventional moving image apparatus (encoder). As shown in FIG. 30, a reference number 101 denotes an image input unit, 103 denotes a discrete cosine transform (DCT) unit for performing orthogonal transformation, 104 denotes a quantizer, 105 denotes a Huffman encoder for executing variable-length coding, 106 denotes a dequantizer, 107 denotes a inverse DCT unit for performing inverse orthogonal transformation, 108 denotes a reference image memory, 109 denotes a motion compensator, 110 denotes a motion detector and 3011 denotes a memory controller.

In the case intra coding is executed in the moving image coding apparatus configured as shown in FIG. 30, intra coding utilizing spatial redundancy in an image frame is executed by performing orthogonal transformation in the DCT unit 103 every macro block of a present image input from the image input unit 101, executing quantization in the quantizer 104 and executing variable-length coding in the Huffman encoder 105.

At this time, a reference image is generated by executing inverse quantization for data after quantization in the dequantizer 106 and performing inverse orthogonal transformation in the inverse DCT unit 107 and is stored in the reference image memory 108.

In the meantime, in the case of inter coding, a present image frame input from the image input unit 101 is compared with a reference image frame stored in the reference image memory 108 in the motion detector 110 and a motion vector is acquired every macro block or every frame. Further, motion compensation using the motion vector is performed for the reference image frame in the motion compensator 109 and a predictive image frame is generated.

Next, inter coding utilizing temporal redundancy between image frames is executed by applying orthogonal transformation to difference between a present image frame and a predictive image frame every macro block in the DCT unit 103, quantizing the result in the quantizer 104 and coding the result in variable length in the Huffman encoder 105.

At this time, a reference image is generated by applying inverse quantization to data after quantization in the dequantizer 106, performing inverse orthogonal transformation in the inverse DCT unit 107 and further, adding to motion compensated predictive data output from the motion compensator 109 and is stored in the reference image memory 108.

As described above, macro blocks of the reference image are generated for all macro blocks in the present image frame for which intra coding and inter coding are performed and are stored in the reference image memory 108. A series of processing that generates a reference image based upon data after inverse quantization is called local decoding.

As described above, predictive coding using a reference image in the compression coding of a moving image is the base of the technique and as further complex predictive coding is used in moving image coding for television broadcasting, various trial for efficiently controlling a buffer memory which has been used for a reference image memory is made (for example, refer to JP-A-11-313327).

A related reference with respect to the application is JP-A-11-313327.

In moving image compression coding technique, to acquire as high image quality as possible in a range of bit rates of available transmission lines, the realization of high compressibility is required.

However, recently, the bit rates of transmission lines available in mobile equipment are greatly enhanced by the development of new communication technology, image compression technique such as MPEG-4 for application to such mobile equipment is also developed and the importance of a low-priced encoder that can be mounted in such mobile equipment increases because more natural moving image communication is enabled in a personal computer and mobile equipment.

In such a background, to reduce the cost of the encoder mounted in mobile equipment, it is considered that not only a buffer memory is efficiently used as in technique disclosed in the patent document 1 but the capacity of a reference image memory is reduced, which is directly related to the reduction of the cost.

It means limitation to predictive coding which is the base of the technique that the capacity of the reference image memory is reduced, as a result, the efficiency of coding is deteriorated and coding quantity is increased. However, in consideration of the bit rates of transmission lines available in recent mobile equipment and actually transmitted image size, it is possible to find practical balance.

In a moving image coding apparatus for a video screen, in the case a reference image memory corresponding to normal screen size is provided, a mass-storage reference image memory according to large screen size is further required to be provided to also enable the moving image coding of the large screen size (a large number of pixels) in the same apparatus and there is a problem that the system cost is increased.

SUMMARY OF THE INVENTION

The object of the invention is to provide moving image coding method and apparatus, performing compression coding for moving images with intra coding and inter coding, which enable the reduction of the capacity of a reference image memory with keeping suitable coding efficiency and suitable image quality according to use to reduce the cost of the moving image coding apparatus.

The invention provides a moving image coding method for coding a moving image, every macro block which forms a predetermined area of a present image, with using intra coding in which image data are orthogonal-transformed, and then image data after the orthogonal-transformation are quantized and variable-length coded, and inter coding in which a motion vector of the present image relative to a reference image is detected, motion compensation for the reference image with using the motion vector is performed, differential data between the present image and the reference image after the motion compensation are orthogonal-transformed, and then differential data after the orthogonal-transformation are quantized and variable-length coded, and for storing, for purpose of the inter coding, a reference image of image frame next to the present image generated by inverse-quantizing and inverse-orthogonal-transforming image data after the quantization or differential data after the quantization in a reference image memory, comprising the step of: determining position of a macro block which is intra-coded or inter-coded, in a range of the maximum number of macro blocks inter-coded in one image frame, when an image (Mth frame, M≦N−1) prior to a present image (Nth frame) is coded.

According to the configuration, reference image of all macro blocks in the current frame are not required to be prepared by determining position of a macro block which is intra-coded or inter-coded when an image prior to the present image is coded. Therefore, the capacity of the reference image memory can be reduced.

Further, macro blocks in a reference image of the next image frame, for only position of which is determined to perform the inter coding, are stored in the reference image memory.

According to the configuration, macro blocks of the reference image stored in the reference image memory can be limited. Therefore, the capacity of the reference image memory can be reduced.

Further, the maximum number of macro blocks which is inter-coded is below the number of macro blocks configuring an image frame.

According to the configuration, memory capacity can be reduced according to the maximum number of macro blocks.

Further, the maximum number of macro blocks which is inter-coded is suitably determined based upon available capacity of the reference image memory.

According to the configuration, as the maximum number of macro blocks which is inter-coded is set according to the size of a variable-length area provided in another memory and available as the reference image memory, the number of macro blocks which is inter-coded can be also made substantially equal to the number of total macro blocks configuring an image frame in the case the available area is large. Therefore, maximum coding efficiency can be dynamically realized according to a state in which the apparatus is used.

Further, the orthogonal transformation is a discrete cosine transform (DCT), and moreover, the variable-length coding is Huffman coding.

Further, position of a macro block which is intra-coded or inter-coded in Nth frame is determined based upon at least one of evaluations of image information and code quantity at a time of coding of an image in or prior to (N−1)th frame.

According to the configuration, as encoded macro block position is determined based upon image information and the code quantity in coding, coding efficiency and image quality can be enhanced.

Further, position of a macro block which is intra-coded or inter-coded in Nth frame is determined in or prior to (N−1)th fame by an external.

According to the configuration, as intra coding or inter coding is instructed by the external, coding according to a type of a moving image can be determined.

Further, the macro block is intra-coded based on an instruction for stopping inter coding at a time of coding of macro block identically positioned in a macro block for which inter coding is determined to be performed in or prior to (N−1)th frame.

According to the configuration, as it may be desirable that inter coding is stopped even if inter coding is determined in the prior frame, coding suitable for a moving image can be determined by determining coding in a current frame again.

Further, position of a macro block which is intra-coded or inter-coded in Nth frame is determined based upon at least one of evaluations of image information and total code quantity of all macro blocks in (N−2)th frame at a time of coding of (N−1)th frame.

According to the configuration, as determination related to the whole image frame such as the switching of a macro block position for which intra coding is performed in the next Nth frame and a macro block position for which inter coding is performed in the next Nth frame can be made in coding in the (N−1)th frame, in the case all code quantity is judged excessive as a result of coding in the (N−2)th frame for example, coding efficiency can be enhanced.

Further, position of a macro block which is intra-coded or inter-coded in Nth frame is determined based upon at least one of evaluations of image information and code quantity of every macro block in (N−1)th frame.

According to the configuration, a macro block position for which intra coding or inter coding is performed in the next frame can be determined based upon image information and the quantity of codes every macro block in coding in the (N−1)th frame. Therefore, coding efficiency can be enhanced.

Further, macro blocks which is intra-coded or inter-coded is provided in a form of a pattern having staggered arrangement.

According to the configuration, the bias of the quantity of codes in coding can be reduced.

Further, in a case that it is determined to perform inter coding for macro blocks to be encoded and it is determined to perform intra coding for macro blocks equal to or more than a predetermined number and adjacent to the macro blocks to be encoded, inter coding is performed for the macro blocks to be encoded with zero as the motion vector.

According to the configuration, as the precision of motion detection and motion compensation is greatly deteriorated because only a few reference images exist or no reference image exists in adjacent macro block positions in the case intra coding is performed for adjacent all or multiple macro blocks, it is considered that the stop of a function of motion compensation has little effect. Then, inter coding can be simplified by applying inter coding with a motion vector as a zero vector. For example, macro blocks for which inter coding is performed corresponds in the case a macro block position for which inter coding is performed is provided in the form of a pattern having staggered arrangement.

Further, it is selected in inter coding whether motion compensation is performed or not.

According to the configuration, in the case an object with a little motion is photographed by a fixed monitoring camera for example, a function of motion compensation is inhibited and inter coding can be simplified by applying inter coding with a motion vector as a zero vector.

Further, position information of macro blocks stored in the reference image memory is held.

Further, in the case evaluation function value calculated based upon difference between a macro block identically positioned in a macro block for which inter coding is performed in (N−1)th frame and a macro block of its reference image is larger than a predetermined threshold, intra coding is performed, in Nth frame, for the macro block identically positioned in the macro block for which the inter coding is performed in the (N−1)th frame.

According to the configuration, as it is considered that the motion of the macro block is large (the motion is hard) in the case the performance function value is larger than the predetermined threshold and it is predicted that the quantity of codes increases due to an error of motion detection in the case inter coding is continuously performed for the macro block position in the next frame, it is judged that there is not large difference in coding efficiency even if intra coding which is generally considered more unsatisfactory in coding efficiency than inter coding is performed instead and image quality can be enhanced by applying intra coding to a macro block in the macro block position. Even if it is judged that there is no recording extra area in the reference image memory, the reference image memory can have an extra by quantity in which intra coding is performed instead and coding efficiency can be synthetically enhanced by producing an extra for applying inter coding to macro blocks in another macro block position.

Further, in a case the number of macro blocks stored in the reference image memory is equal to the maximum number of macro blocks for which inter coding is performed, intra coding is performed for a macro block, which is positioned in a subsequent macro block, in the next image frame.

According to the configuration, the number of macro blocks which enables to be stored in the reference image memory can be controlled.

Further, in the case a frequency of continuous inter coding for macro blocks identically positioned in a macro block for which inter coding is performed in (N−1)th frame is larger than a predetermined threshold, intra coding is performed for a macro block identically positioned in the macro block for which the inter coding is performed in the (N−1)th frame in Nth frame.

According to the configuration, as recovery is difficult when an error in communication is superimposed in the case inter coding which is coding based upon difference is continuous in the same macro block position, resistance to an error can be enhanced by applying intra coding once per a few frames.

Further, in the case evaluation function value calculated based upon difference between a inter-coded macro block adjacent to a macro block for which is intra-coded in (N−1)th frame and a macro block of its reference image is smaller than the predetermined threshold and the number of macro blocks stored in the reference image memory is smaller than the number of the maximum number of macro blocks which can be stored in the reference image memory, inter coding is performed, in Nth frame, for the macro block identically positioned in the macro block for which the intra coding is performed in the (N−1)th frame.

According to the configuration, as it is considered that in the case the performance function value is smaller than the predetermined threshold, the current state is a state close to a static image in which the motion of macro blocks is small, the motion of macro blocks for which these macro blocks are adjacent and for which intra coding is performed may be also possibly small in consideration of spatial correlation and it can be judged that the motion in the next frame is also small in consideration of temporal correlation, coding efficiency can be enhanced by applying inter coding to macro blocks in the macro block position in the next frame.

Further, in the case code quantity of a macro block for which intra coding is performed in (N−1)th frame is more than a predetermined threshold and the number of macro blocks stored in the reference image memory is smaller than the maximum number of macro blocks which can be stored in the reference image memory, inter coding is performed, in Nth frame, for the macro block identically positioned in the macro block for which the intra coding is performed in the (N−1)th frame.

According to the configuration, as it is judged that coding efficiency may be deteriorated when intra coding is also performed for a macro block in a macro block position for which intra coding is performed in consideration of temporal correlation and which is judged unsatisfactory in coding efficiency in the next frame, coding efficiency can be enhanced by applying inter coding to macro blocks in the macro block position in the next frame.

Further, in the case a frequency of continuous intra coding for macro block identically positioned in a macro block for which intra coding is performed in (N−1)th frame is larger than a predetermined threshold and the number of macro blocks stored in the reference image memory is smaller than the maximum number of macro blocks which can be stored in the reference image memory, inter coding is performed, in Nth frame, for the macro block identically positioned in the macro block for which the intra coding is performed in the (N−1)th frame.

According to the configuration, as coding efficiency is generally unsatisfactory in intra coding, compared with inter coding though the continuous application of intra coding to a macro block position may be determined in the case no macro block for which inter coding is performed is adjacent, encoding efficiency can be enhanced by applying inter coding once per a few frames.

Further, motion information of a target area for which intra coding is performed is provided in (N−1)th frame; intra coding is performed, in Nth frame, for a macro block identically positioned in a macro block which is predicted to be the target area in Nth frame; and inter coding is performed, in Nth frame, for a macro block in the periphery of the macro block.

According to the configuration, as intra coding for valuing image quality is performed for a target of photographing based upon the target area and the motion information, inter coding for valuing coding efficiency is performed for the periphery of the target and this area can be moved in accordance with the motion of the target in the next frame, efficient coding focused upon the target of photographing is enabled.

Further, in a case of coding a moving image in which image frame is configured by macro blocks which number is equal to or less than the maximum number of inter-coded macro blocks, macro blocks of a reference image are generated for all positions of a macro block and are stored in the reference image memory; and in a case of coding a moving image in which image frame is configured by macro blocks which number exceeds the maximum number of inter-coded macro blocks, macro blocks of a reference image are generated for only position of a macro block which is determined to be performed inter coding and are stored in the reference image memory.

According to the configuration, moving image coding in plural image sizes by a simple system is enabled. For example, as the number of macro blocks for which inter coding is performed is not limited and normal moving image coding is enabled in the case of a CIF image the number of macro blocks of which is 396 in the case the number of maximum macro blocks for which inter coding is performed is 400 and the corresponding reference image memory is provided, the number of macro blocks for which inter coding is performed is limited and moving image coding is enabled in the case of a VGA image the number of macro blocks of which is 1200, moving image coding in both image sizes is enabled by the simple system for reducing the cost of the reference image memory.

Further, a frequency of inter coding is held every position of macro blocks; and in starting, inter coding is performed for macro blocks from a macro block positioned where a frequency of inter coding is more in order.

According to the configuration, subsequent image quality and coding efficiency can be made satisfactory by previously applying inter coding to the macro block in the macro block position for which inter coding is frequently performed in initialization. For example, in the case of an image from a fixed monitoring camera, as inter coding is previously allocated to a macro block in a macro block position in which motion is small, coding efficiency after reactivation is enhanced.

Further, it is selected whether the frequency of inter coding is held or not and whether inter coding is previously performed from a macro block positioned where a frequency of inter coding is more in order or not.

According to the configuration, holding the frequency of inter coding and the precedent allocation of inter coding can be selected, image quality and coding efficiency can be improved by previously allocating inter coding to the macro block in the macro block position for which inter coding is frequently performed in the case of use for a fixed monitoring camera for example, and in the case of use for a mobile camera, as these functions are not effective, coding according to application is enabled by coding without selection.

Further, in a case a sum of code quantity of all macro blocks which are inter-coded in (N−1)th frame exceeds a predetermined threshold for detecting scene change, intra coding is performed for all macro block in the Nth frame.

According to the configuration, as the efficiency of inter coding is deteriorated and the quantity of codes increases when scene change occurs, macro block positions for which intra coding or inter coding is performed in the next frame can be set to staggered arrangement by detecting the scene change and applying intra coding to the macro blocks in all the macro block positions when the scene change occurs and subsequent coding efficiency can be enhanced.

The invention provides a moving image coding method for coding a moving image, every macro block which forms a predetermined area of a present image, with using intra coding in which image data are orthogonal-transformed, and then image data after the orthogonal-transformation are quantized, and variable-length coded, and inter coding in which a motion vector of the present image relative to a reference image is detected, motion compensation for the reference image with using the motion vector is performed, differential data between the present image and the reference image after the motion compensation are orthogonal-transformed, and then differential data after the orthogonal transformation are quantized and variable-length coded, and for storing, for purpose of the inter coding, a reference image of image frame next to the present image generated by inverse-quantizing and inverse-orthogonal-transforming image data after the quantization or differential data after the quantization in a reference image memory, comprising the step of: determining position of a macro block which is intra-coded or inter-coded in a predetermined pattern.

According to the configuration, in the case a macro block position for which intra coding or inter coding is performed in the next frame is given as an initial value such as in the case intra coding is performed for all macro blocks regularly or in scene change, the bias of the quantity of codes in coding is reduced and coding efficiency can be enhanced by giving the pattern of the suitable macro block position.

Further, the predetermined pattern is a pattern where macro blocks which is inter-coded are arranged in staggered format.

According to the configuration, the bias of the quantity of codes in coding can be minimized by providing the pattern in which the macro block position for which inter coding is performed is expressed in the staggered arrangement as an initial value.

Further, the predetermined pattern is a pattern where macro blocks which is inter-coded are arranged in lattice format.

According to the configuration, the bias of the quantity of codes in coding is reduced by providing the pattern in which the macro block position for which inter coding is performed is expressed in the lattice arrangement as an initial value and coding efficiency can be enhanced because opportunities for motion detection in coding increase.

The invention provides a moving image coding apparatus provided with encoding means for encoding a moving image, every macro block which forms a predetermined area of a present image, with using intra coding for in which image data are orthogonal-transformed, and then image data after the orthogonal transformation are quantized and variable-length coded, and inter coding in which a motion vector of the present image relative to a reference image is detected, motion compensation for the reference image with using the motion vector is performed, differential data between the present image and the reference image after the motion compensation are orthogonal-transformed, and then differential data after the orthogonal transformation are quantized and variable-length coded, and a reference image memory for storing, for purpose of the inter coding, a reference image of image frame next to the present image generated by inverse-quantizing and inverse-orthogonal-transforming image data after the quantization or differential data after the quantization, comprising: determining means for determining position of a macro block which is intra-coded or inter-coded in a range of the maximum number of macro blocks which is inter-coded in one image frame when an image (Mth frame, M≦N−1) prior to a present image (Nth frame) is coded.

According to the configuration, reference images of all macro blocks are not required to be prepared in the current frame by determining the macro block position for which intra coding or inter coding is performed in the coding of the image prior to the present image and the capacity of the reference image memory can be reduced.

Further, the reference image memory stores macro blocks in a reference image of the next image frame, for only position of which is determined to perform the inter coding.

According to the configuration, the macro blocks of the reference image stored in the reference image memory can be limited. Therefore, the capacity of the reference image memory can be reduced.

Further, the reference image memory has smaller capacity than capacity required to store a reference image for all macro blocks configuring an image frame.

Further, address management means for managing position of a macro block in a reference image stored in the reference image memory in correspondence with an address of the reference image memory.

Further, macro block number counting means for counting the number of macro blocks in a reference image stored in the reference image memory.

Further, in a case the number of macro blocks stored in the reference image memory is equal to the maximum number of macro blocks for which inter coding is performed, the determining means determines to intra code for a macro block, which is positioned in a subsequent macro block, in the next image frame.

According to the configuration, the number of macro blocks which enables to be stored in the reference image memory can be managed.

Further, function value calculating means for calculating evaluation function value based upon difference between a macro block identically positioned in a macro block for which inter coding is performed and a macro block in a reference image stored in the reference image memory.

Further, the determining means performs intra coding for a macro block identically positioned in the macro block for which the inter coding is performed in a next image frame, in a case the evaluation function value is larger than a predetermined threshold.

According to the configuration, as it is considered that the motion of the macro block is large (the motion is hard) in the case the performance function value is larger than the predetermined threshold and the quantity of codes is predicted to increase due to an error of motion detection in the case inter coding is continuously performed for the macro block in the corresponding macro block position in the next frame, it is judged that there is not large difference in coding efficiency even if intra coding generally considered to be unsatisfactory in coding efficiency, compared with inter coding is performed, and image quality can be enhanced by applying intra coding to the macro block in the macro block position. Even if it is judged that there is no recording extra area in the reference image memory, the reference image memory can have space by the quantity of the application of intra coding and synthetic coding efficiency can be enhanced by producing free space for inter coding performed for macro blocks in another macro block position.

Further, inter coding frequency counting means for counting a frequency of continuous inter coding in each position of a macro block.

Further, the determining means performs intra coding for a macro block positioned where the frequency of continuous inter coding is equal to a predetermined threshold in the next image frame.

According to the configuration, as recovery is difficult when errors in communication are superimposed in the case inter coding for coding based upon difference is continuous in the same macro block position, resistance to an error can be enhanced by applying intra coding once per a few frames.

Further, intra coding frequency counting means for counting a frequency of continuous intra coding in each position of a macro block.

Further, the determining means performs inter coding for a macro block positioned where the frequency of continuous intra coding is equal to a predetermined threshold in the next image frame, in a case the number of macro blocks stored in the reference image memory is smaller than the maximum number of macro blocks which can be stored in the reference image memory.

According to the configuration, as intra coding is generally not satisfactory in coding efficiency, compared with inter coding though it may be determined that intra coding is continuously performed for a macro block in a macro block position for which intra coding is to be performed in the case no macro block for which inter coding is performed is adjacent in the periphery, coding efficiency can be enhanced by applying inter coding once per a few frames.

Further, the coding means performs inter coding for a macro block adjacent to all or over-predetermined number of a macro block which is intra-coded with zero as the motion vector.

According to the configuration, in the case an object hardly with a motion is photographed by a fixed monitoring camera for example, inter coding can be simplified by inhibiting a function for motion compensation and inter coding with a motion vector zero.

The invention provides a semiconductor integrated circuit, comprising the moving image coding apparatus.

According to the configuration, the integrated circuit wherein the reduction of the number of terminals of a chip, the miniaturization of a substrate of the reference image memory, the reduction of power consumption between pads and the acceleration of processing speed are enabled by building the reference image memory the capacity of which can be reduced in the semiconductor integrated circuit can be realized.

BRIEF DESCRIPTION OF THE DRAWINGS

FIG. 8 is an explanatory drawing for explaining moving image coding control in the fourth embodiment of the invention;

DETAILED DESCRIPTION OF THE PREFERRED EMBODIMENTS

Figure 1:
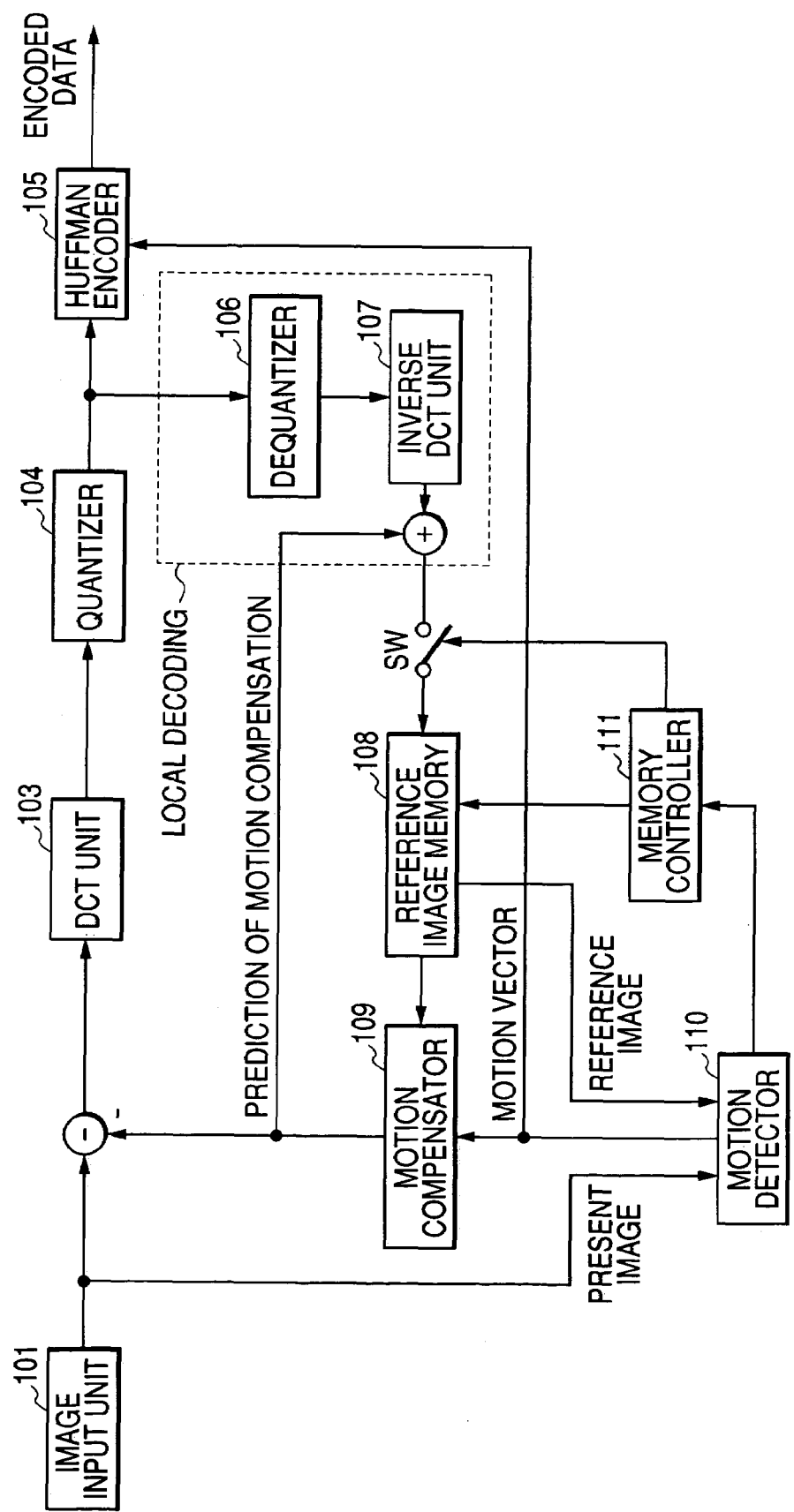
FIG. 1 is a block diagram showing the configuration of a moving image coding apparatus equivalent to a first embodiment of the invention.

Referring to the drawings, embodiments of the invention will be described below. Values of thresholds used in the following embodiments are values for explanation and do not limit the embodiments of the invention. In the following embodiments, another orthogonal transformation technique may be also used for orthogonal transformation in place of DCT in the following embodiments and another variable-length coding technique may be also used for variable-length coding in place of Huffman coding.

First Embodiment

Figure 30:
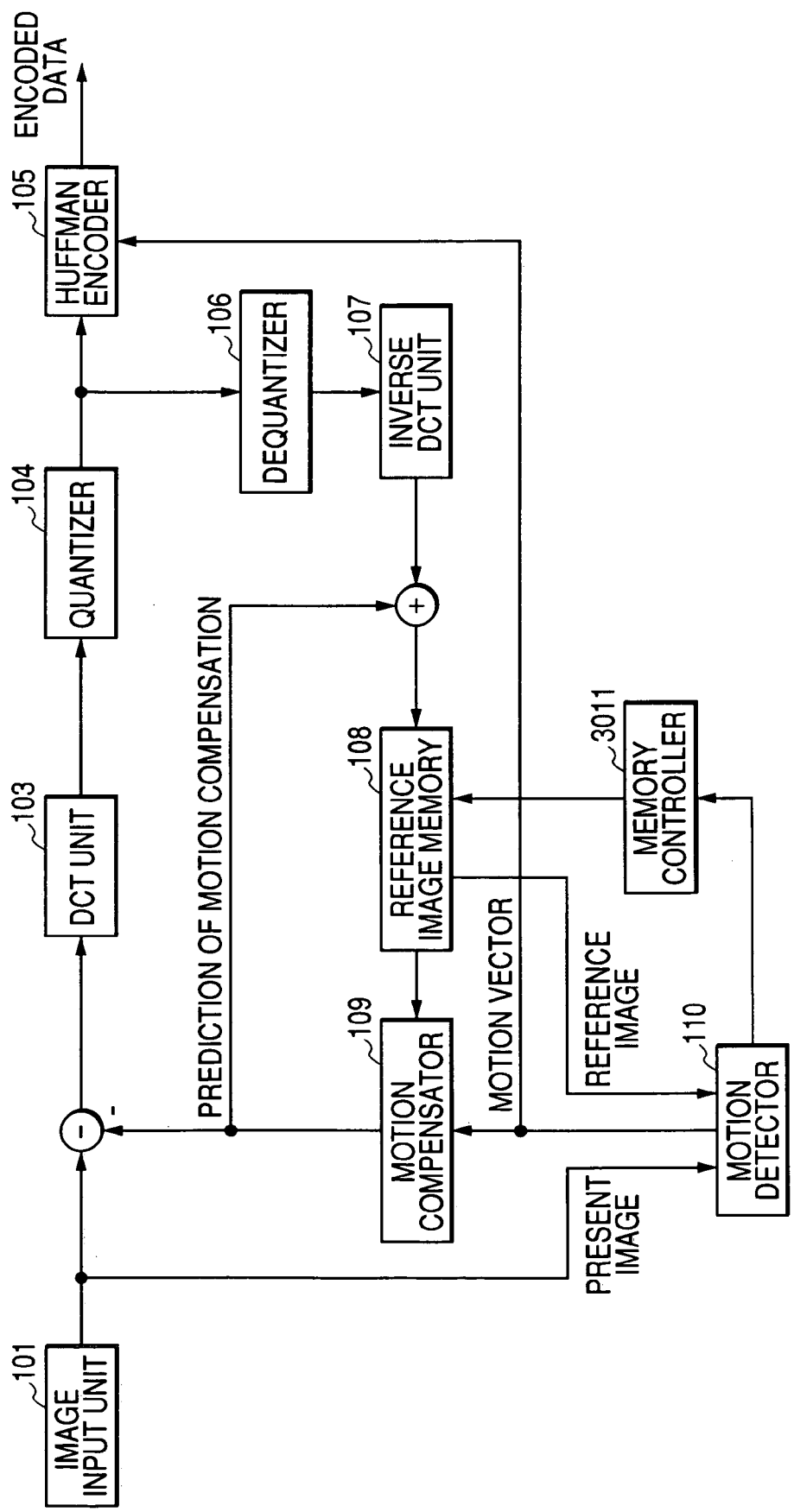
FIG. 30 is a block diagram showing the configuration of a conventional moving image coding apparatus.

FIG. 1 is a block diagram showing the configuration of a moving image coding apparatus equivalent to a first embodiment of the invention. In FIG. 1, the same reference number is allocated to the same part as the part in the conventional moving image coding apparatus shown in FIG. 30.

As shown in FIG. 1, a reference number 101 denotes an image input unit, 103 denotes a DCT unit that performs orthogonal transformation, 104 denotes a quantizer, 105 denotes a Huffman encoder that executes variable-length coding, 106 denotes a dequantizer, 107 denotes a inverse DCT unit that performs inverse orthogonal transformation, 108 denotes a reference image memory, 109 denotes a motion compensator, 110 denotes a motion detector and 111 denotes a memory controller.

In the memory controller 111, the number of maximum macro blocks for which inter coding is performed in one image frame is set to a smaller value than the number of macro blocks configuring an image frame and in a range of the set number of maximum macro blocks, macro block positions for which inter coding is performed in the next frame are determined. Hereby, the reference image memory is not required to be a frame memory for recording a reference image of the whole one image frame and can be configured with capacity required for the number of maximum macro blocks for which inter coding is performed.

In FIG. 1, a state in which the memory controller 111 executes recording control for recording only macro blocks for which inter coding is performed in the next frame in the reference image memory 108 is schematically shown by a switching function (SW).

Figure 2:
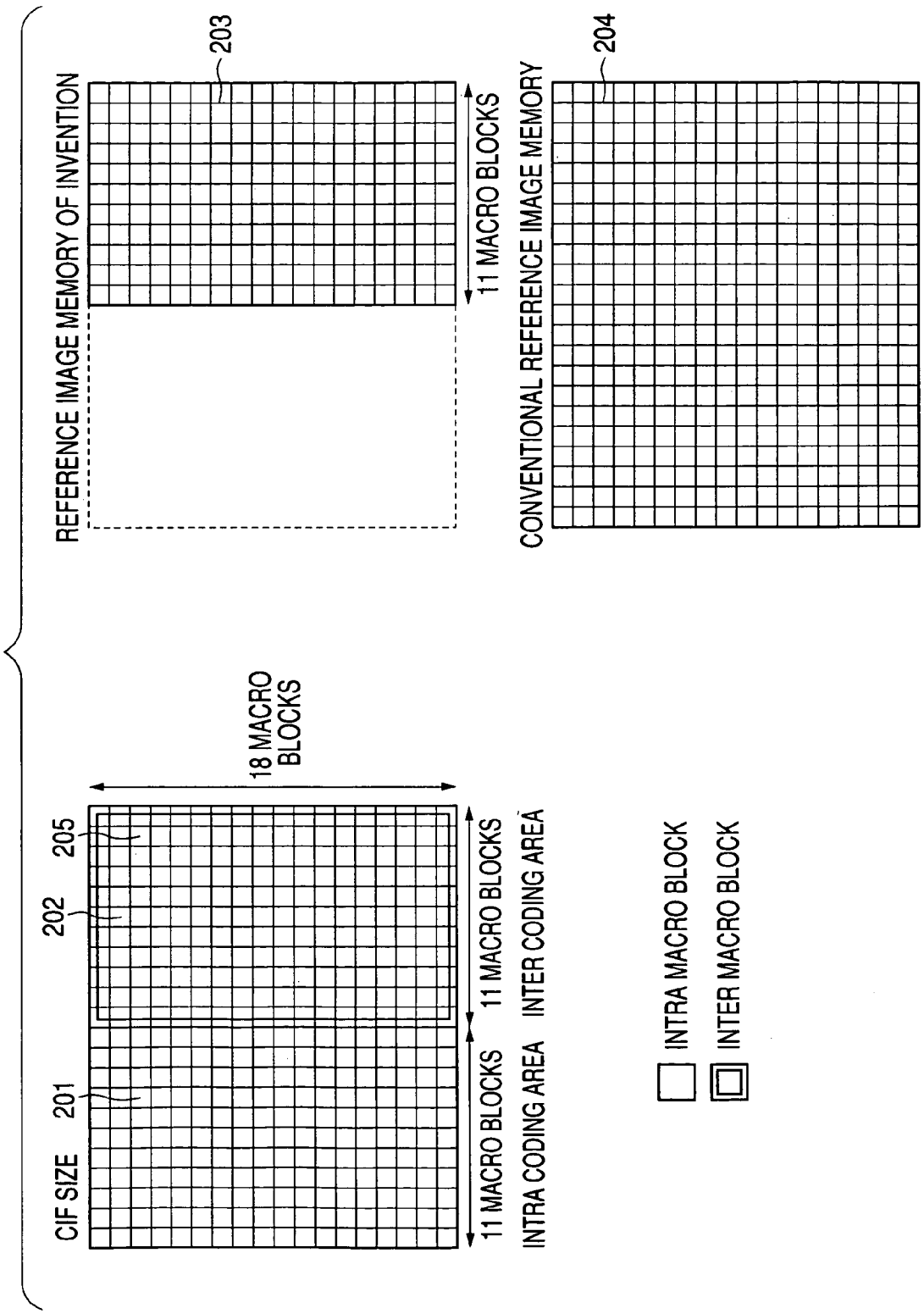
FIG. 2 is an explanatory drawing for explaining recording control over a reference image memory in the first embodiment of the invention.

FIG. 2 is an explanatory drawing for explaining recording control over the reference image memory in this embodiment. A moving image in FIG. 2 is constituted by common intermediate format (CIF) (macro blocks: 22×18 pieces) images, the ratio of macro blocks for which intra coding is performed and macro blocks for which inter coding is performed inter coding is 50% to 50%, a layout composed of macro block positions for which intra coding is performed is shown on the left side of a frame (a screen) and a layout composed of macro block positions for which inter coding is performed is shown on the right side of the frame (the screen).

As only a group of reference image macro blocks 203 in macro block positions for which inter coding is performed in the next frame is recorded into the reference image memory 108, the capacity of the reference image memory 108 can be reduced to capacity equivalent to a half of a conventional frame memory 204 that can record reference images in all macro block positions.

Referring to FIG. 2, a concrete example of moving image coding will be described below. In a first frame, intra coding is performed for all macro blocks. At this time, a reference image is recorded into the reference image memory 108, however, for the group of macro blocks 201 in macro block positions for which intra coding is performed in a second frame, reference image macro blocks are not recorded and for a group of macro blocks 202 in macro block positions for which inter coding is performed in the second frame, a group of reference image macro blocks 203 are generated and recorded.

In the next second frame, for a group of a macro block in a macro block position for which intra coding is performed, the similar coding to that in the first frame is repeated, for a group of macro blocks 205 in a macro block position for which inter coding is performed, the group of reference image macro blocks 203 recorded into the reference image memory 108 is read, motion detection is performed by the motion detector 110, motion compensation is performed using a motion vector acquired in the motion detection by the motion compensator 109 and macro blocks of a predictive image are generated.

Next, difference between macro blocks of the present image and macro blocks of the predictive image for which the motion compensation is performed is acquired, the differential data is encoded by the DCT unit 103, the quantizer 104 and the Huffman encoder 105 and inter coding data is acquired.

Further, differential macro block data after quantization is locally decoded, reference image macro blocks for macro blocks for which inter coding is performed in a third frame are generated and are recorded into the reference image memory 108. The reference image macro block data recorded into the reference image memory 108 is recorded at the same address every macro block. That is, as the reference image macro blocks are overwritten in the same position every processing, the capacity of the reference image memory 108 may be always fixed.

Moving image coding shown in FIG. 2 is executed by also repeating the similar operation to that in the second frame in the third frame and in subsequent frames and executing subsequent coding so that intra coding is performed for macro blocks on the left side of the frame and inter coding is performed for macro blocks on the right side.

In the embodiment shown in FIG. 2, for explanation, intra coding macro block positions and inter coding macro block positions are arranged on the left side and the right side of the screen. This embodiment is not limited to the right and left sides or the upside and the downside of the screen and the two parts. However, when the number of divisions is increased, a range of motion detection is narrowed, the precision of motion detection may be deteriorated and further, memory control is also complex.

According to this embodiment, the capacity of the reference image memory can be reduced by recording only reference image a macro block in a macro block position for which inter coding is performed in the next frame in the reference image memory and a low-cost moving image coding system can be realized.

Second Embodiment

Figure 3:
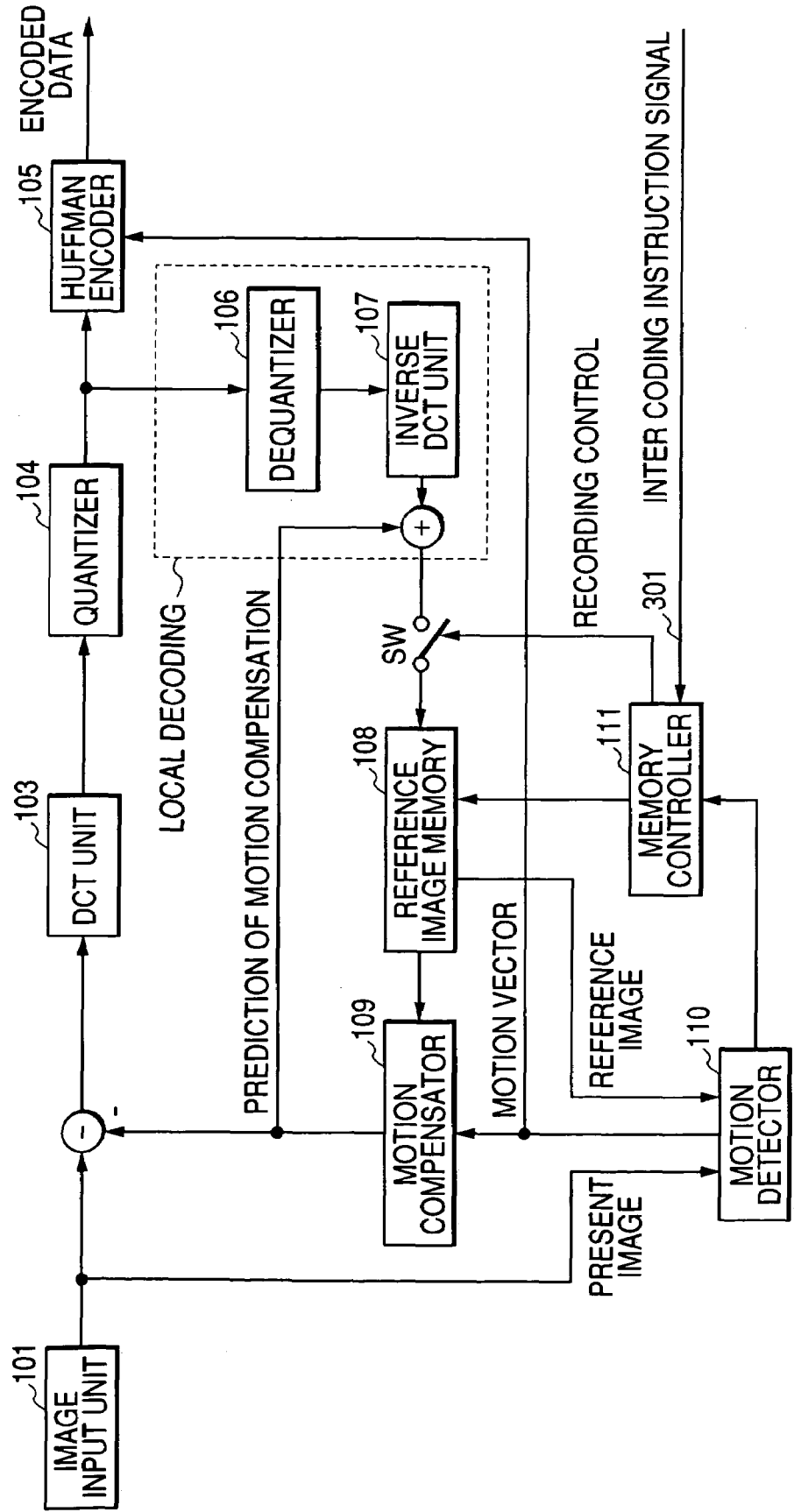
FIG. 3 is a block diagram showing the configuration of a moving image coding apparatus equivalent to a second embodiment of the invention.

FIG. 3 is a block diagram showing the configuration of a moving image coding apparatus equivalent to a second embodiment of the invention. As shown in FIG. 3, the same reference number is allocated to the same part as the part in the moving image coding apparatus equivalent to the first embodiment shown in FIG. 1.

In the moving image coding apparatus in this embodiment, the arrangement of a macro block position for which intra coding is performed and a macro block position for which inter coding is performed is specified from an external. In FIG. 3, in addition to the configuration shown in FIG. 1, an inter coding instruction signal 301 from the external is input to a memory controller 111.

As there is a case that coding efficiency is deteriorated when a macro block position for which intra coding is performed and a macro block position for which inter coding is performed are fixed on the screen as shown in FIG. 2 depending upon a photographed image, a user judges a photographed image in this embodiment and the coding division of a macro block position can be set from the external.

Figure 4:
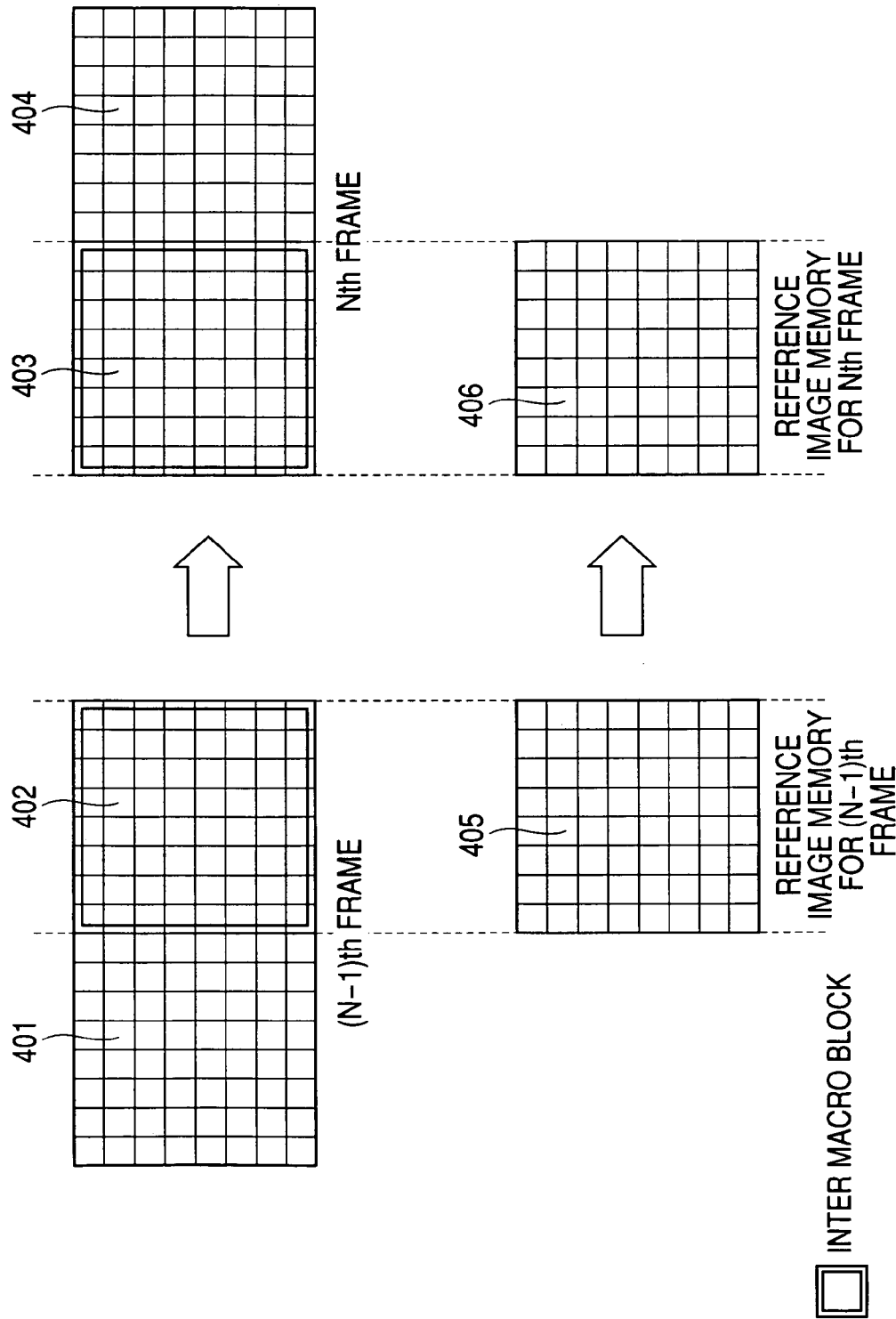
FIG. 4 is an explanatory drawing for explaining recording control over a reference image memory in the second embodiment of the invention.

FIG. 4 is an explanatory drawing for explaining recording control over a reference image memory in this embodiment. As shown in FIG. 4, in the (N−1)th frame, a group of macro blocks 401 for which intra coding is performed is shown on the left side of the frame, a group of macro blocks 402 for which inter coding is performed is shown on the right side and a group of reference image macro blocks 405 in a macro block position for which inter coding is performed in the (N−1)th frame is recorded into the reference image memory 108.

Suppose that before coding processing in the (N−1)th frame, the inter coding instruction signal 301 is input from the external and an instruction for changing so that a macro block position for which inter coding is performed is located on the left side of a frame and a macro block position for which intra coding is performed is located on the right side in the Nth frame is transmitted to the memory controller 111.

First, in coding processing in the (N−1)th frame, the group of macro blocks 402 for which inter coding is performed is encoded using the group of reference image macro blocks 405 recorded into the reference image memory 108. Next, the group of macro blocks 401 for which intra coding is performed is encoded.

The reason why the coding of a macro block for which inter coding is performed is previously executed is that as a macro block position for which intra coding is performed in the (N−1)th frame is equivalent to a macro block position for which inter coding is performed in the Nth frame, a group of reference image macro blocks 406 in a macro block position for which inter coding is performed in the Nth frame is required to be recorded into the reference image memory 108.

That is, the capacity of the reference image memory 108 is fixed without being increased by previously using the group of reference image macro blocks 405 recorded into the reference image memory 108 and overwriting the group of reference image macro blocks 406 for inter coding in the Nth frame on it.

If a suitable criterion for stopping inter coding is acquired, it is also possible to determine whether inter coding is to be performed or intra coding is to be performed finally in the Nth frame using reference image macro blocks recorded into the reference image memory 108 in the (N−1)th frame.

According to this embodiment, as a user can specify a macro block position for which inter coding is performed and a macro block position for which intra coding is performed via the external, moving image coding in accordance with a photographed scene is enabled. At that time, the capacity of the reference image memory can be reduced as in the first embodiment by writing only reference image macro blocks to be used in the next frame in the reference image memory.

Third Embodiment

Figure 5:
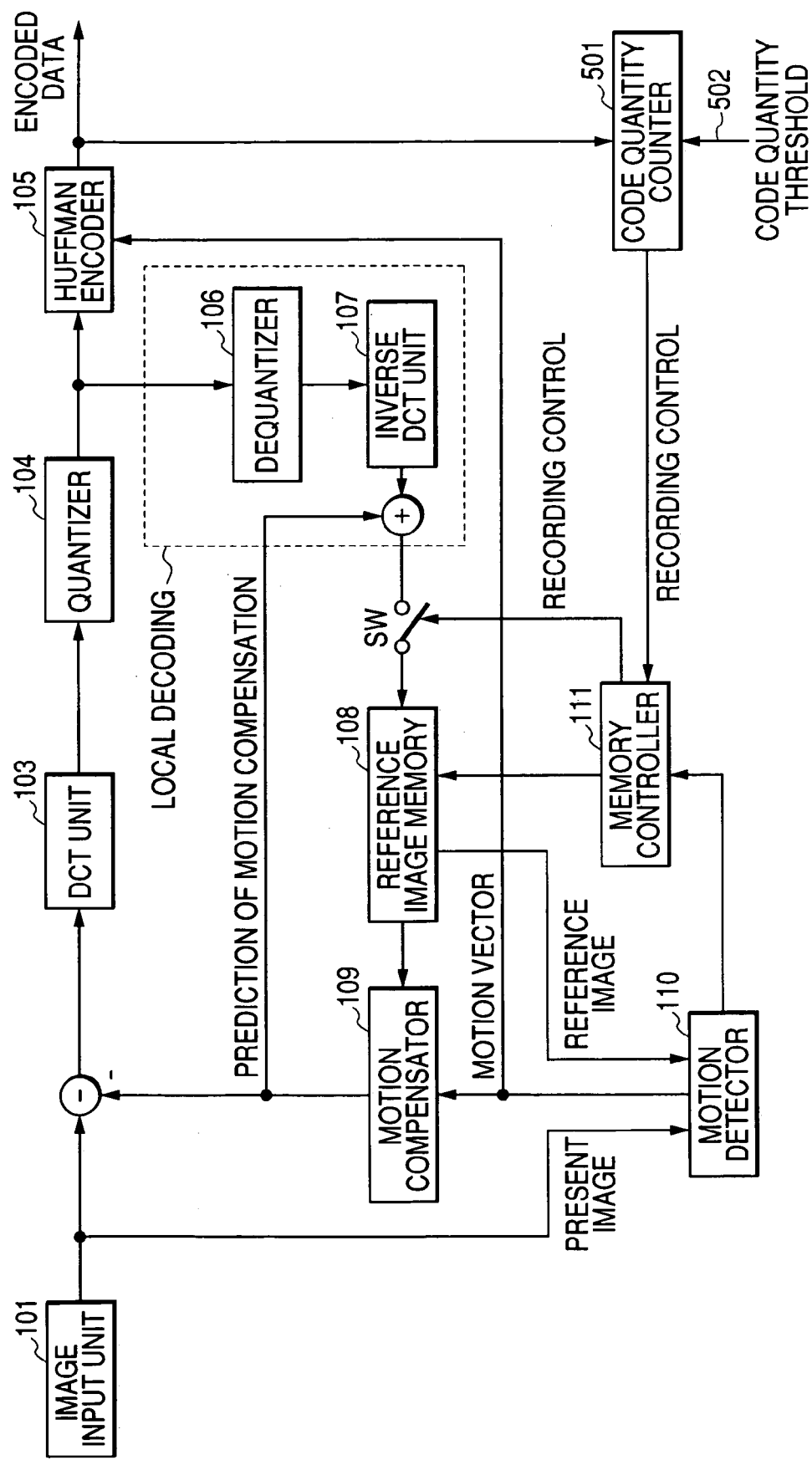
FIG. 5 is a block diagram showing the configuration of a moving image coding apparatus equivalent to a third embodiment of the invention.

FIG. 5 is a block diagram showing the configuration of a moving image coding apparatus equivalent to a third embodiment of the invention. In FIG. 5, the same reference number is allocated to the same part as that in the moving image coding apparatus equivalent to the first embodiment shown in FIG. 1.

In the moving image coding apparatus in this embodiment, a macro block position for which intra coding or inter coding is performed is determined based upon the quantity of codes in an image frame. In FIG. 5, in addition to the configuration shown in FIG. 1, a code quantity counter 501 for counting the quantity of codes in an image frame is provided and a code quantity threshold 502 is input from an external.

Figure 6:
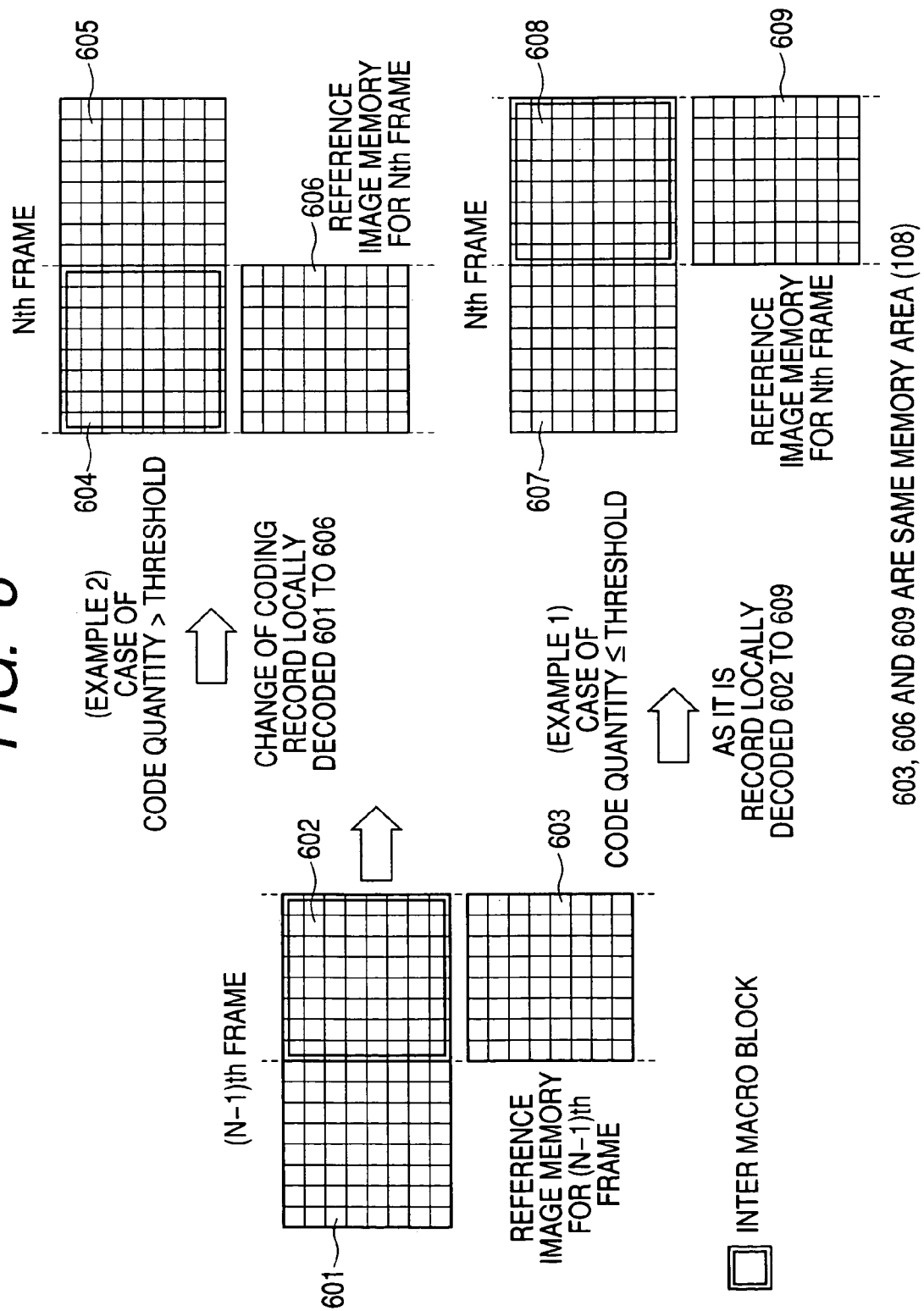
FIG. 6 is an explanatory drawing for explaining recording control over a reference image memory in the third embodiment of the invention.

FIG. 6 is an explanatory drawing for explaining recording control over a reference image memory in this embodiment. As shown in FIG. 6, suppose that a group of macro blocks 601 for which intra coding is performed is located on the left side of a frame in the (N−1)th frame, a group of macro blocks 602 for which inter coding is performed is located on the right side and a group of reference image macro blocks 603 in a macro block position for which inter coding is performed is recorded into the reference image memory 108. For the order of coding, as same with the second embodiment, the group of macro blocks 602 for which inter coding is performed is previously encoded, and the group of macro blocks 601 for which intra coding is performed is next encoded.

Before the coding of the (N−1)th frame, the code quantity threshold 502 of the quantity of codes is input to the code quantity counter 501 and in the case the sum of the quantity of codes in the group of macro blocks 602 for which inter coding is performed in the (N−1)th frame is smaller than the code quantity threshold, the memory controller 111 controls so that a macro block position for which intra coding is performed is located on the left side of a frame and a macro block position for which inter coding is performed is located on the right side in the Nth frame as in the (N−1)th frame as shown in an example 1 in FIG. 6.

That is, the group of macro blocks 602 for which inter coding is performed is encoded, its local decoded data is recorded into the reference image memory 108 by overwriting the local decoded data on the group of reference image macro blocks 603 as a group of reference image macro blocks 609 and the local decoded data of the group of macro blocks 601 for which intra coding is performed is not recorded into the reference image memory 108 according to the acquired result of determination based upon the threshold.

As a result, only the group of reference image macro blocks 609 of the group of the macro blocks 608 for which inter coding is performed in the Nth frame is recorded into the reference image memory 108. Hereby, inter coding can be performed for the group of macro blocks 608 using the group of reference image macro blocks 609 in the Nth frame. It means that image coding in a scene can be executed within the desired quantity of codes that the sum of the quantity of codes for which inter coding is performed is smaller than the code quantity threshold.

Next, in the case the sum of the quantity of codes in the group of macro blocks 602 for which inter coding is performed in the (N−1)th frame is larger than the code quantity threshold, the memory controller 111 controls so that the Nth frame has arrangement inverse to that in the (N−1)th frame as shown in an example 2 in FIG. 6, that is, a macro block position for which inter coding is performed is located on the left side of the frame and a macro block position for which intra coding is performed is located on the right side.

That is, the group of macro blocks 602 for which inter coding is performed is encoded and its local decoded data is recorded into the reference image memory 108 by overwriting the local decoded data on the group of reference image macro blocks 603 as the group of the reference image macro blocks 609, however, as the arrangement of the coding division of a macro block position is changed according to the acquired result of determination based upon the threshold, the local decoded data of the group of macro blocks 601 for which intra coding is performed next is recorded into the reference image memory 108 by overwriting the local decoded data on the group of reference image macro blocks 609 as the group of reference image macro blocks 606.

As a result, only the group of reference image macro blocks 606 of the group of macro blocks 604 for which inter coding is performed in the Nth frame is recorded into the reference image memory 108. Hereby, inter coding can be performed for the group of macro blocks 604 in the Nth frame using the group of reference image macro blocks 606.

The reason why the sum of the quantity of codes for which inter coding is performed is larger than the code quantity threshold is that the motion of an image in the scene is fast and the quantity of codes increases due to an error caused by the deterioration of motion detection matching precision and it can be judged that even if intra coding is performed, coding efficiency is not deteriorated. Instead, coding efficiency may be synthetically improved by applying inter coding to another macro block position for which intra coding is performed. As arrangement satisfactory in coding efficiency is selected by the memory controller by providing the threshold, a user is not required to specify a coding layout every scene change as in the second embodiment.

According to this embodiment, the optimization of the coding layout based upon the judgment of the sum of the quantity of codes in an image frame is automated and coding efficiency can be enhanced. Besides, as in the first and second embodiments, only reference image macro blocks used in the next frame are written in the reference image memory and the capacity of the reference image memory can be reduced.

Fourth Embodiment

As in the first to third embodiments, the screen is simply divided for the coding division of macro block positions as shown in FIGS. 4 and 6, the bias of coding efficiency on the screen occurs. In a fourth embodiment, a pattern considered so that no bias of coding efficiency occurs is adopted as a macro block position for which intra coding and inter coding are performed.

Figure 7:
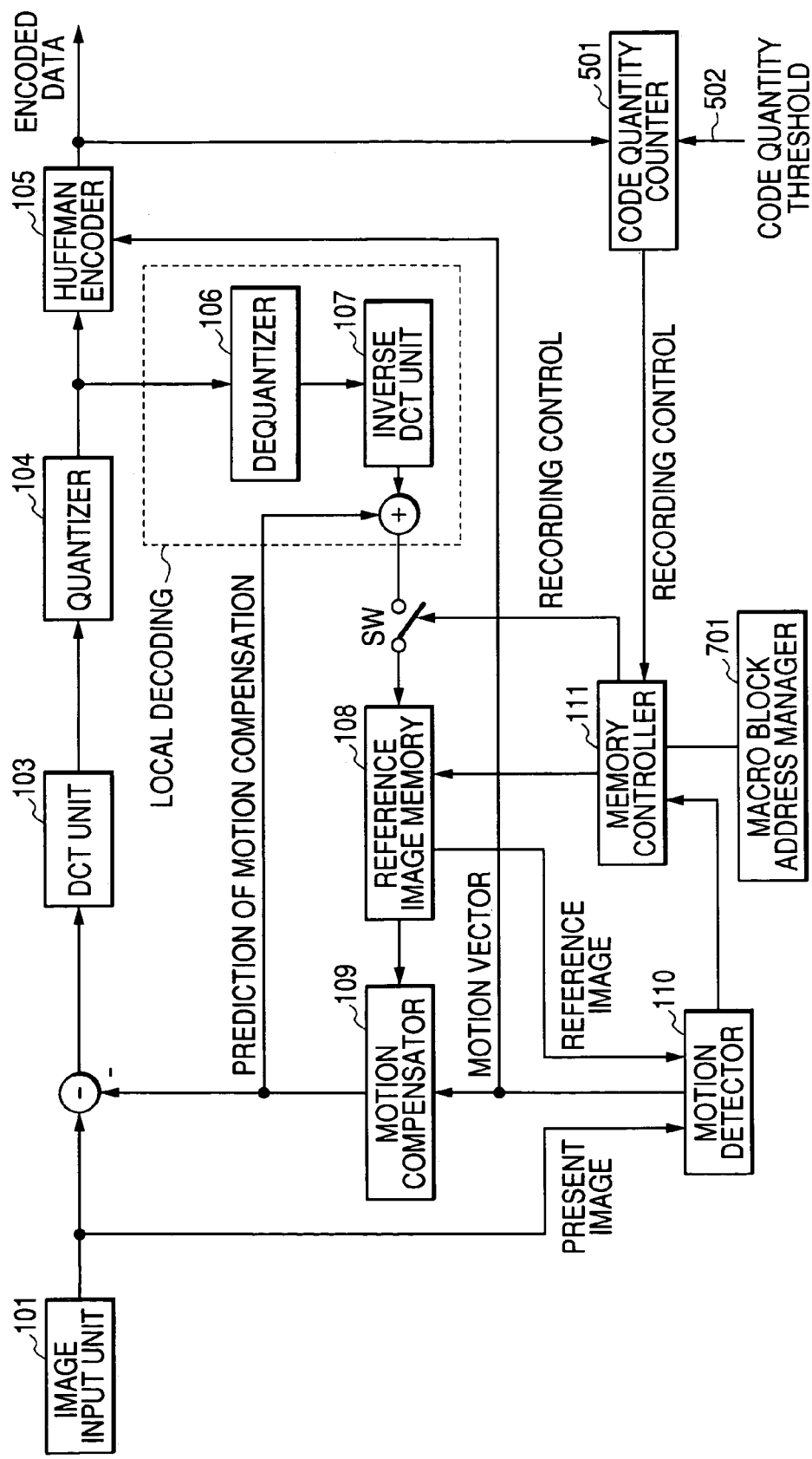
FIG. 7 is a block diagram showing the configuration of a moving image coding apparatus equivalent to a fourth embodiment of the invention.

FIG. 7 is a block diagram showing the configuration of a moving image coding apparatus equivalent to the fourth embodiment of the invention. In FIG. 7, the same reference number is allocated to the same part as that in the moving image coding apparatus equivalent to the first embodiment shown in FIG. 1.

FIG. 8 is an explanatory drawing for explaining moving image coding control in this embodiment. In the embodiment shown in FIG. 8, suppose that an image frame is configured by 16 macro blocks as like 801 showing a macro block position (a macro block address) and a macro block position for which intra coding or inter coding is performed is provided in the form of a pattern having staggered arrangement as shown in 802.

As the management of a macro block position of a reference image recorded into a reference image memory 108 is required by arranging the coding division of a macro block position in a pattern except a simply divided pattern as described above, a macro block address manager 701 for recording the macro block position of the reference image recorded into the reference image memory 108 so that the macro block position can be contrasted with an address of the reference image memory is provided in the moving image coding apparatus equivalent to this embodiment as shown in FIG. 7. Hereby, access to the reference image memory 108 is enabled by specifying a macro block position of a reference image.

Besides, as coding efficiency may be deteriorated depending upon a subsequent scene in a state in which the coding division of a macro block position is fixed in a pattern such as staggered arrangement, a code quantity counter 501 for counting the quantity of codes in an image frame is provided in FIG. 7 as shown in FIG. 5 to detect the deterioration of coding efficiency and a code quantity threshold 502 from an external is input. Hereby, in the case the quantity of codes counted by the code quantity counter 501 is larger than the code quantity threshold 502, a memory controller 111 controls so that the pattern such as staggered arrangement is inverted.

The quantity of codes counted by the code quantity counter 501 and the code quantity threshold 502 are based upon the sum of the quantity of codes in one image frame.

When the coding division of macro block positions is staggered in the (N−2)th frame 802 as shown in FIG. 8, macro blocks are encoded in order from a macro block position 1 to 16.

Suppose that as a result of image coding in the (N−2)th frame, the sum of the quantity of codes in one image frame totalized by the code quantity counter 501 is larger than the code quantity threshold 502. However, as a reference image 803 is recorded into the reference image memory 108 for inter coding in the (N−1)th frame, the memory controller 111 cannot invert the staggered coding division in the (N−1)th frame even if the sum of the quantity of codes in the (N−2)th frame is judged to be large.

Then, in the (N−1)th frame 804, coding is executed in the similar coding division to that in the (N−2)th frame 802 and reference image macro blocks generated based upon macro blocks for which intra coding is performed are recorded into the reference image memory 108 to be a reference image 805 for which inter coding is performed in the Nth frame 806. Then, the coding division of macro block positions is inverted and is changed to staggered arrangement shown in the Nth frame 806.

As a result, coding can be executed according to the pattern acquired by inverting the coding division of the staggered arrangement of macro block positions using the reference image 805 in the Nth frame 806 and coding satisfactory in coding efficiency according to the change of a scene can be realized.

In this embodiment, a reference image macro block used for motion detection and reference image macro blocks in the periphery are recorded zigzag by arranging macro block positions for which intra coding and inter coding are performed zigzag. As a result, as motion detection precision in units of macro block is greatly deteriorated, motion detection is executed in units of pixel in a macro block.

However, as motion detection exceeding one macro block is disabled in motion detection in units of pixel in one macro block, motion detection precision is extremely deteriorated for an image the motion of which is hard. Then, even if motion detection and motion compensation are stopped and a motion vector is fixed to a zero vector to simplify moving image coding, large difference is not made as a result.

Figure 9:
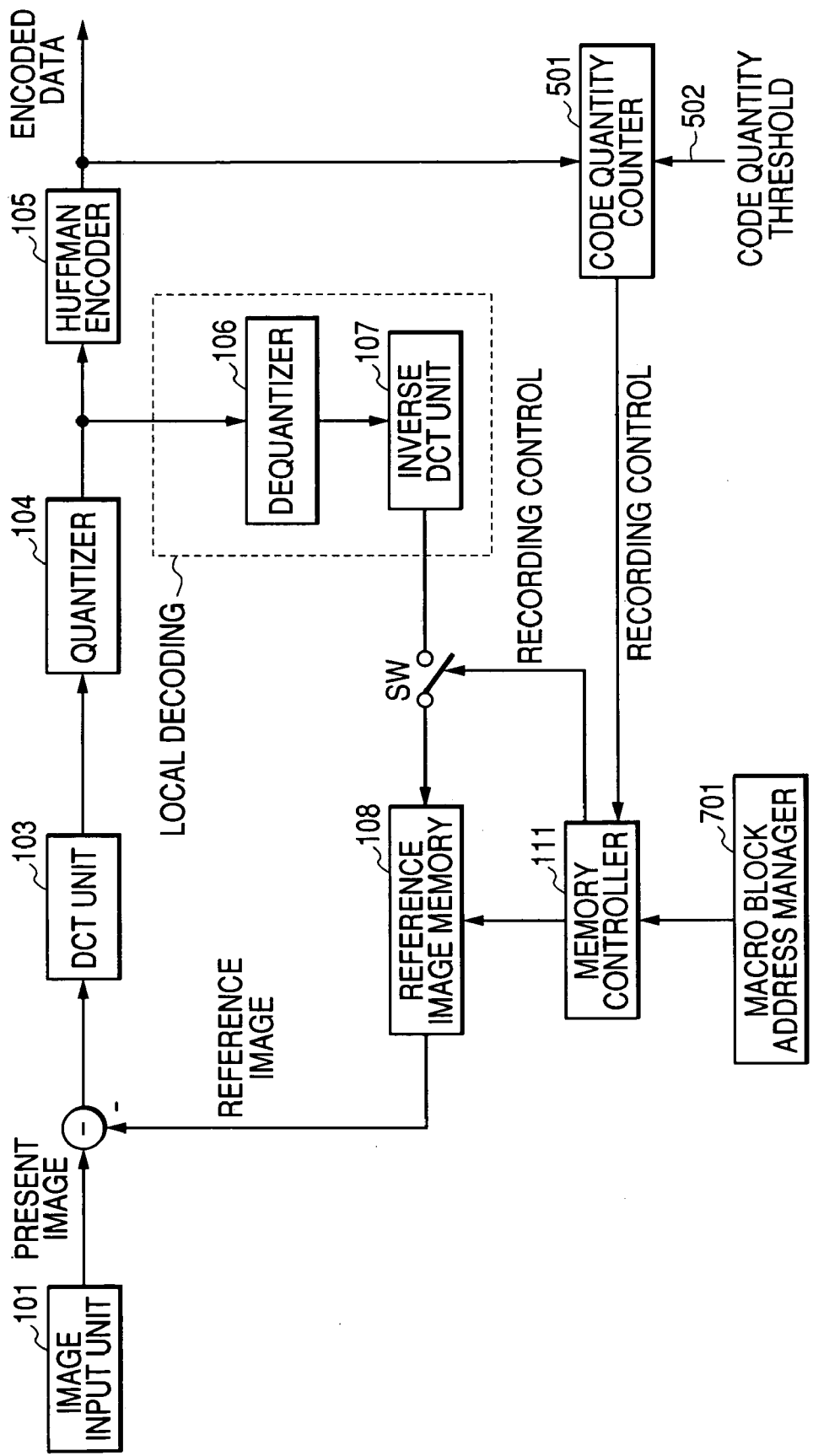
FIG. 9 is a block diagram showing the configuration in which moving image coding is simplified of the moving image coding apparatus equivalent to the fourth embodiment of the invention.

FIG. 9 is a block diagram showing the simplified configuration of the moving image coding apparatus equivalent to the fourth embodiment shown in FIG. 7 in which moving image coding is simplified. In FIG. 9, a motion compensator 109 and a motion detector 110 are removed from the configuration shown in FIG. 7. For example, in the case staggered arrangement is adopted as the coding division of macro block positions in mobile equipment the screen of which is small, the cost of the apparatus can be reduced, with keeping practical coding efficiency by the simplified configuration.

According to this embodiment, the bias of coding efficiency on the screen can be eliminated by arranging macro block positions for which intra coding and inter coding are performed in the pattern such as staggered arrangement, the optimization of a coding layout is enabled by further executing control that the quantity of encoded codes is determined and the coding division of macro block positions is inverted, and coding efficiency can be enhanced.

The case that the staggered arrangement is used as a pattern of macro block positions for which intra coding and inter coding are performed is described above, however, the use of such a pattern is effective not only in the case the same pattern continues to be used as in this embodiment but in the case it is determined according to screen information and the quantity of codes every macro block whether either coding is to be performed in a subsequent frame and macro block positions for which intra coding and inter coding are performed are changed.

For example, in the case intra coding is regularly performed for all macro blocks, the bias of the quantity of codes in coding is reduced and coding efficiency can be enhanced by providing the suitable coding division of macro block positions as the initialization of macro block positions for which intra coding and inter coding are performed in the next frame.

Figure 10:
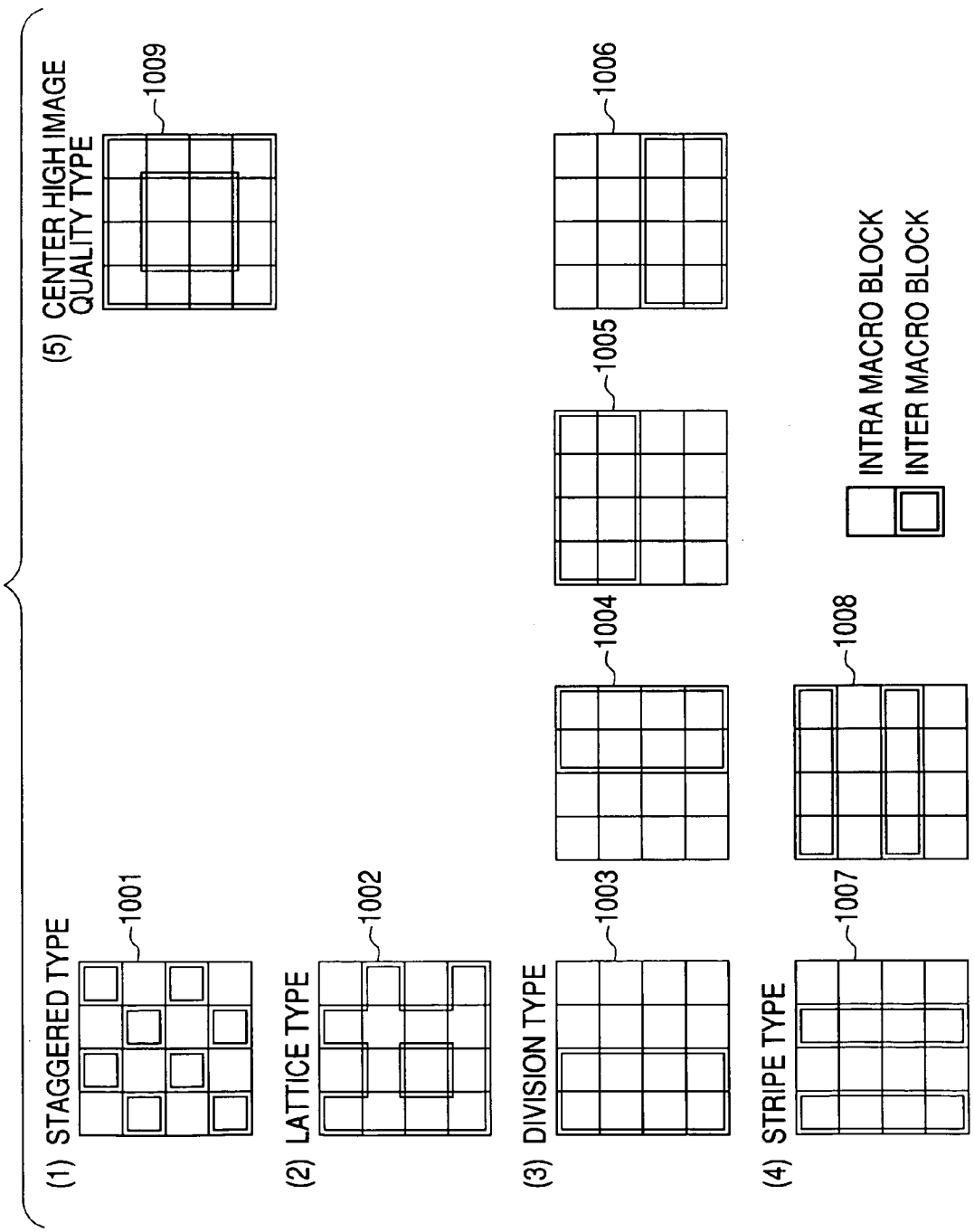
FIG. 10 shows an example of an initialization pattern of a macro block position for which intra coding or inter coding is performed.

FIG. 10 shows an example of an initialization pattern of macro block positions for which intra coding and inter coding are performed. As shown in FIG. 10, a pattern 1001 has staggered arrangement in this embodiment, the capacity of the reference image memory can be reduced to a half of a frame memory for recording a reference image of the whole one image frame and the bias of the quantity of codes on the screen may be reduced most, however, for a defect, it can be given that as reference image macro blocks are recorded zigzag, only diagonal reference image macro blocks can be referred for macro blocks in the periphery and the precision of motion detection is deteriorated.

A pattern 1002 shown in FIG. 10 is a lattice type and as there are plural adjacent reference image macro blocks horizontally and vertically, motion detection between macro blocks is enabled and the precision of motion detection is enhanced, however, as macro blocks for which inter coding is performed are increased, the capacity of the reference image memory cannot be reduced to a half of the frame memory for recording a reference image of the whole one image frame.

Patterns 1003 to 1006 shown in FIG. 10 are the divided type described in the first embodiment, the capacity of the reference image memory can be reduced to a half of the frame memory for recording a reference image of the whole one image frame and memory control for recording the reference image because of the simple pattern is easy, however, except a case of a special image, the bias of the quantity of codes on the screen increases.

Patterns 1007 and 1008 shown in FIG. 10 are a stripe type, the capacity of the reference image memory can be reduced to a half of the frame memory for recording a reference image of the whole one image frame and the precision of motion detection in a direction of a stripe is enhanced, however, the bias of the quantity of codes on the screen is large, compared with the staggered type and the lattice type.

A pattern 1009 shown in FIG. 10 is a central high image quality type that intra coding is performed for the center of the screen and the image quality of the center of the screen is satisfactory, however, the capacity of the reference image memory cannot be reduced to a half of the frame memory for recording a reference image of the whole one image frame and except a case of a special image, the bias of the quantity of codes on the screen increases.

Fifth Embodiment

The technique in the fourth embodiment is useful for a method of initializing macro block positions for which intra coding and inter coding are performed in the next frame in the case the quantity of codes in one image frame exceeds a threshold and particularly, in the case intra coding is performed for all macro blocks regularly or by scene change, staggered arrangement is effective as the initialization of a coding division pattern for the next frame.

A fifth embodiment is an example in which the fourth embodiment is performed, in the case the quantity of codes is abnormally much, the state is detected as scene change based upon the observation of the quantity of codes in an image frame, in the case the scene change is detected, intra coding is performed for all macro blocks and staggered arrangement is used for a coding division pattern for the next frame.

Figure 11:
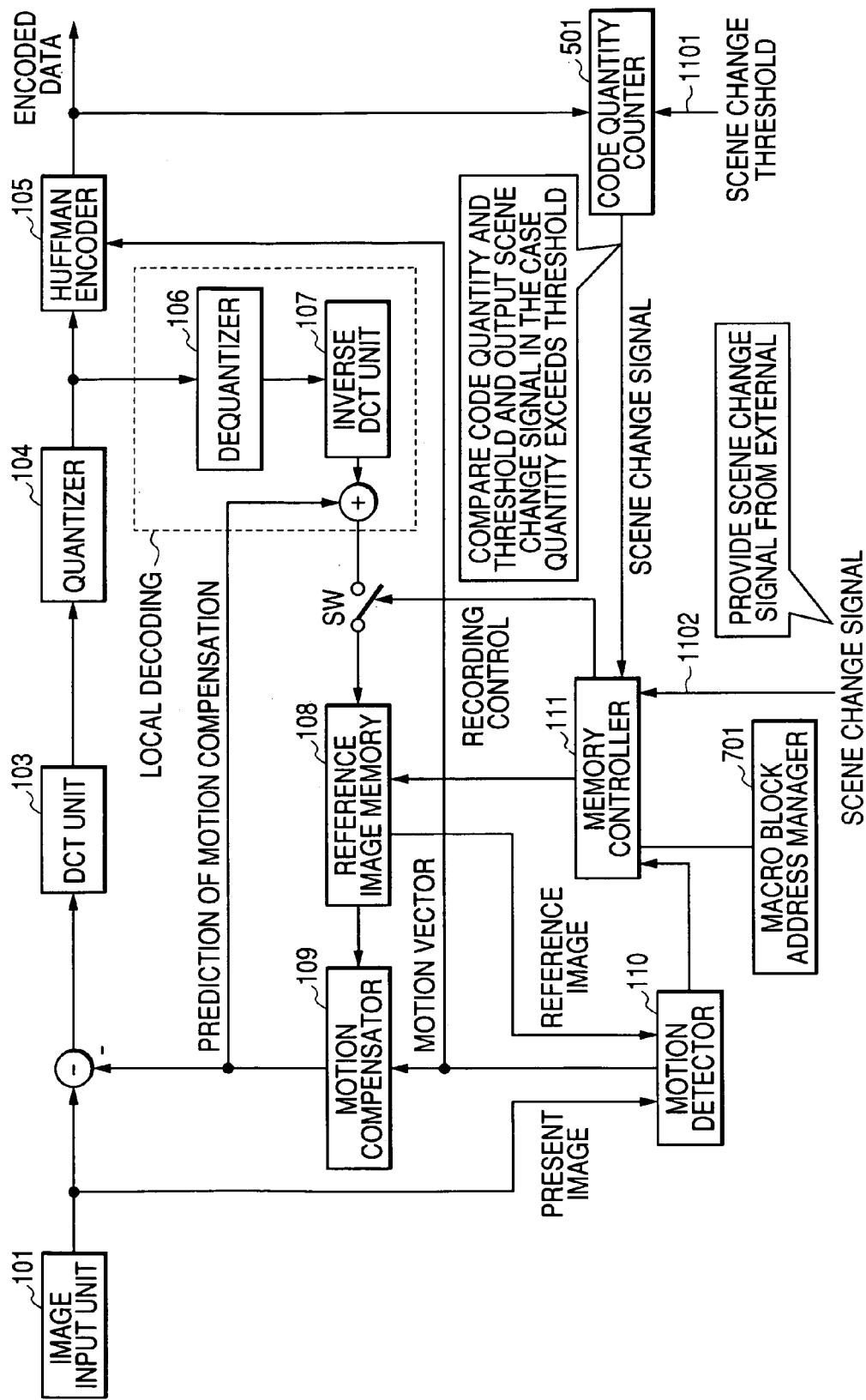
FIG. 11 is a block diagram showing the configuration of a moving image coding apparatus equivalent to a fifth embodiment of the invention.

FIG. 11 is a block diagram showing the configuration of a moving image coding apparatus equivalent to the fifth embodiment of the invention. In FIG. 11, the same reference number is allocated to the same part as that in the moving image coding apparatus shown in FIG. 1 in the first embodiment and in the moving image coding apparatus shown in FIG. 7 in the fourth embodiment.

In the configuration shown in FIG. 11, a scene change threshold 1101 input to a code quantity counter 501 from an external and a scene change signal 1102 input to a memory controller 111 from the external are added to the configuration shown in FIG. 7.

Figure 12:
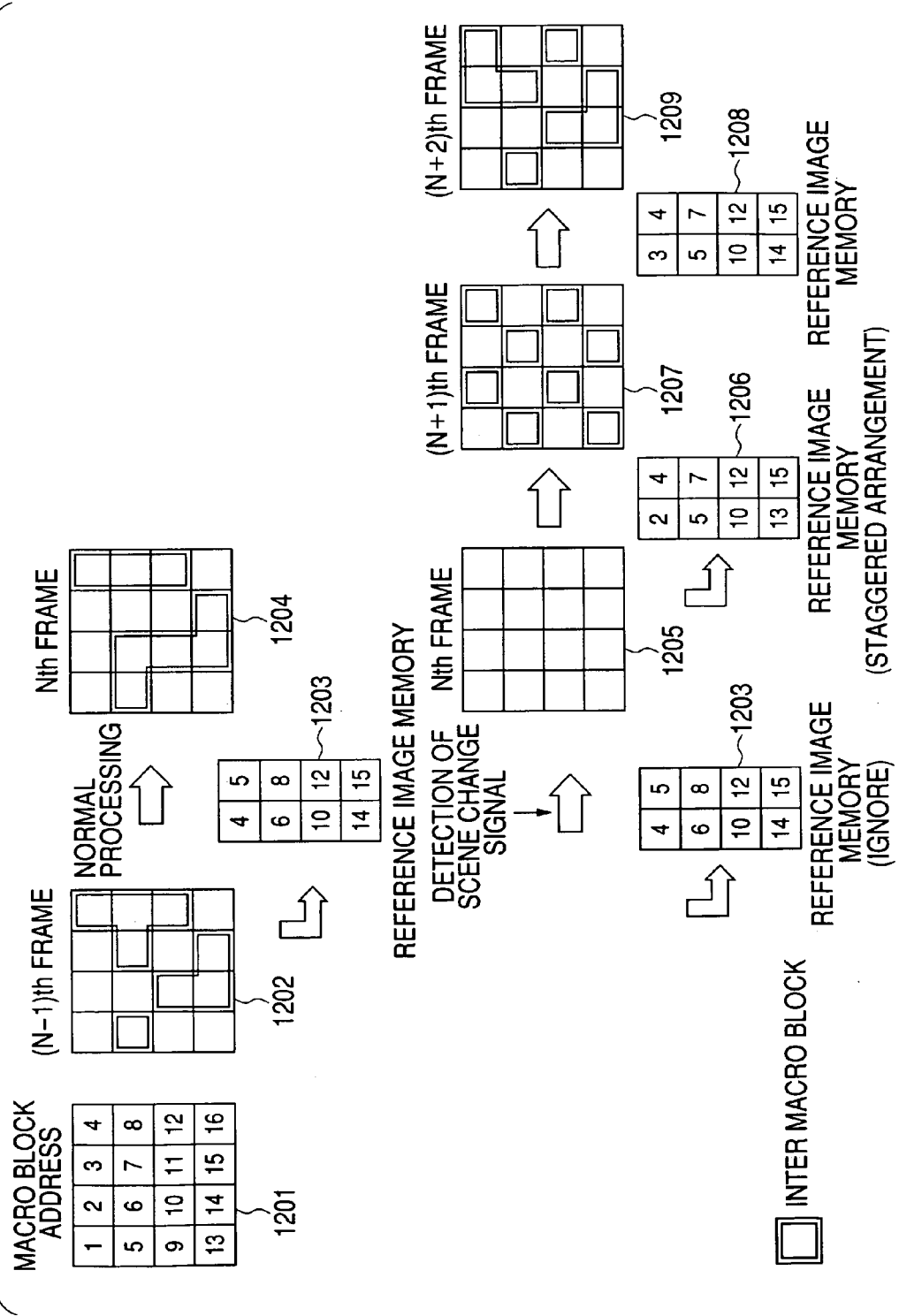
FIG. 12 is an explanatory drawing for explaining moving image coding control in the fifth embodiment of the invention.

FIG. 12 is an explanatory drawing for explaining moving image coding control in this embodiment. In this embodiment shown in FIG. 12, an image frame shall be configured by 16 macro blocks as in 1201 showing a macro block position (a macro block address).

In the case normal coding is executed in the (N−1)th frame 1202, coding is executed according to the division of intra coding and inter coding every macro block position, a reference image 1203 is generated and is recorded into a reference image memory 108 and processing proceeds to the Nth frame 1204. In FIG. 12, a case that it is determined every macro block which coding is executed in the next frame, which will be described in the next sixth embodiment, is shown and inter coding is performed for a macro block position 6 in the (N−1)th frame 1202 for which intra coding is determined to be performed.

Suppose that scene change occurs in the (N−1)th frame, it is detected that the sum of the quantity of codes observed by the code quantity counter 501 exceeds the scene change threshold 1101 or the scene change signal 1102 is transmitted from the external. In this case, as coding efficiency is not made satisfactory even if the reference image 1203 recorded into the reference image memory 108 in the Nth frame is used, it is determined that the recorded reference image 1203 is ignored and intra coding is performed for all macro blocks in the Nth frame.

In the Nth frame 1205 in which it is determined that intra coding is performed for all macro blocks, staggered arrangement is adopted as a coding division pattern for the next (N+1)th frame, intra coding is performed for all macro blocks, a reference image 1206 for macro block positions for which inter coding is performed in the staggered arrangement are generated and is recorded into the reference image memory 108.

In the (N+1)th frame 1207 in which macro block positions for which inter coding is performed are included in the staggered arrangement, coding is executed using the reference image 1206 recorded into the reference image memory 108, processing is returned to normal coding processing in which it is determined every macro block which coding is executed in the next frame, a reference image 1208 is generated and processing proceeds to the (N+2)th frame 1209.

In this embodiment, as the initialization of an effective coding division pattern, the staggered arrangement is selected, however, as another pattern may be more effective depending upon a property of a photographed moving image, it is desirable that a suitable pattern that enhances coding efficiency is selected according to a purpose.

Sixth Embodiment

In the fourth and fifth embodiments, the bias of coding efficiency on the screen is eliminated by using the coding division pattern having staggered arrangement and executing moving image coding, however, coding efficiency cannot be enhanced according to a scene by only using the same coding division pattern and its inverted pattern.

In a sixth embodiment, coding efficiency is enhanced by determining every macro block which coding of intra coding and inter coding is executed in the Nth frame based upon the judgment of the information an image frame in the Nth frame and the quantity of codes of each macro block.

Figure 13:
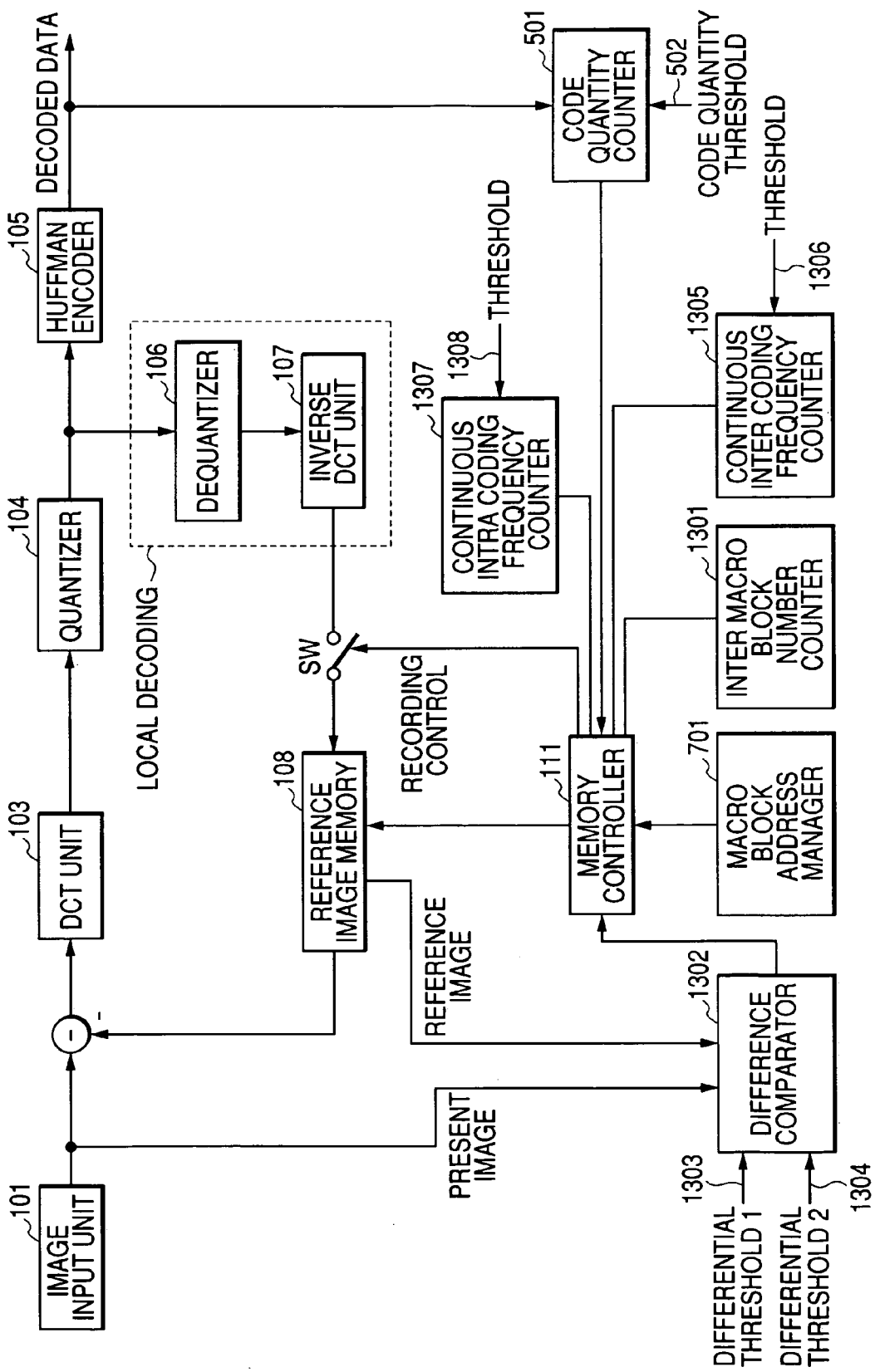
FIG. 13 is a block diagram showing the configuration of a moving image coding apparatus equivalent to a sixth embodiment of the invention.

FIG. 13 is a block diagram showing the configuration of a moving image coding apparatus equivalent to the sixth embodiment of the invention. In FIG. 13, the same reference number is allocated to the same part as that in the moving image coding apparatus shown in FIG. 1 in the first embodiment and in the moving image coding apparatus shown in FIG. 7 in the seventh embodiment.

In the configuration shown in FIG. 13, an inter-macro block number counter 1301, a difference comparator 1302, a differential threshold 1 (1303) and a differential threshold 2 (1304) respectively input to the difference comparator 1302, a continuous inter coding frequency counter 1305, a threshold 1306 input to the continuous inter coding frequency counter 1305, a continuous intra coding frequency counter 1307 and a threshold 1308 input to the continuous intra coding frequency counter 1307 are added to the configuration shown in FIG. 7.

In the invention, a reference image equivalent to only a macro block position for which inter coding is performed in the next frame is recorded into a reference image memory 108, however, in this embodiment, as it is determined every macro block position which coding is executed in the next frame, the number of reference images recorded into the reference image memory 108 and its macro block position (its macro block address) vary.

Therefore, in addition to a macro block address manager 701 for managing a macro block position related to recording in the reference image memory 108, the inter-macro block number counter 1301 is provided to manage the number of reference image macro blocks in a present image frame for recording in the reference image memory 108.

A method of managing the number of reference image macro blocks using these is as follows. For the inter-macro block number counter 1301, a two-way counter in which up-count (+1) and down-count (−1) are possible is used and when reference image macro blocks for the capacity are recorded into the reference image memory 108, a count value is zero.

In the case inter coding is, in the next frame, performed for a macro block in a macro block position for which intra coding is performed in the present image frame, the down-count (−1) is performed, in the case in the next frame, intra coding is performed for a macro block in a macro block position for which inter coding is performed in the present image frame, the up-count (+1) is performed and in the case coding division is unchanged, a count value is unchanged.

A memory controller controls so that the inter-macro block number counter 1301 is controlled as described above, only in the case a count value is +1 or more, inter coding can be performed for a macro block in a macro block position for which intra coding is performed in the present image frame in the next frame and reference image macro blocks can be recorded into the reference image memory 108.

That is, reference image macro blocks in a new macro block position can be recorded only in recording space produced by reducing recorded reference image macro blocks in the reference image memory. In the case coding is executed in the order of macro block positions in the present image frame by controlling the number of reference image macro blocks recorded into the reference image memory 108 as described above, the number of reference image macro blocks recorded into the reference image memory 108 can be controlled so that macro block positions for which inter coding is performed are not biased.

In a method contrastive with this, when coding is executed in the order of macro block positions in the present image frame, only the number of macro blocks for which inter coding is determined to be performed in the next frame is counted by the inter-macro block number counter 1301 independent of the coding division of the present image frame, and in the case a count value reaches the number of maximum macro blocks for which inter coding is performed and the reference image memory is full, intra coding is determined to be performed for a macro block in a macro block position subsequently encoded in the present image frame in the next image frame.

In this method, control is simple, however, depending upon a situation of an image, bias may occur in macro block position for which intra coding and inter coding are performed.

The difference comparator 1302 determines a coding method every macro block position in the next frame by acquiring difference between macro blocks for which inter coding is performed in the present image frame and reference image macro blocks or calculating a performance function value based upon the difference and sending the result of the comparison of the performance function value and a differential threshold to the memory controller 111. The performance function value is equivalent to the sum of differential absolute values for example.

The continuous inter coding frequency counter 1305 counts a frequency of continuous inter coding every macro block position and the continuous intra coding frequency counter 1307 counts a frequency of continuous intra coding every macro block position. These counters for the number of macro block positions are not required to be prepared, these counters can be realized by memories for the number of macro block positions and an adder and may be also provided inside the memory controller 111.

FIGS. 14 to 19 are explanatory drawings for explaining moving image coding control in this embodiment. In this embodiment shown in these drawings, an image frame is configured by 16 macro blocks as like 1401 showing a macro block position (a macro block address).

Figure 14:
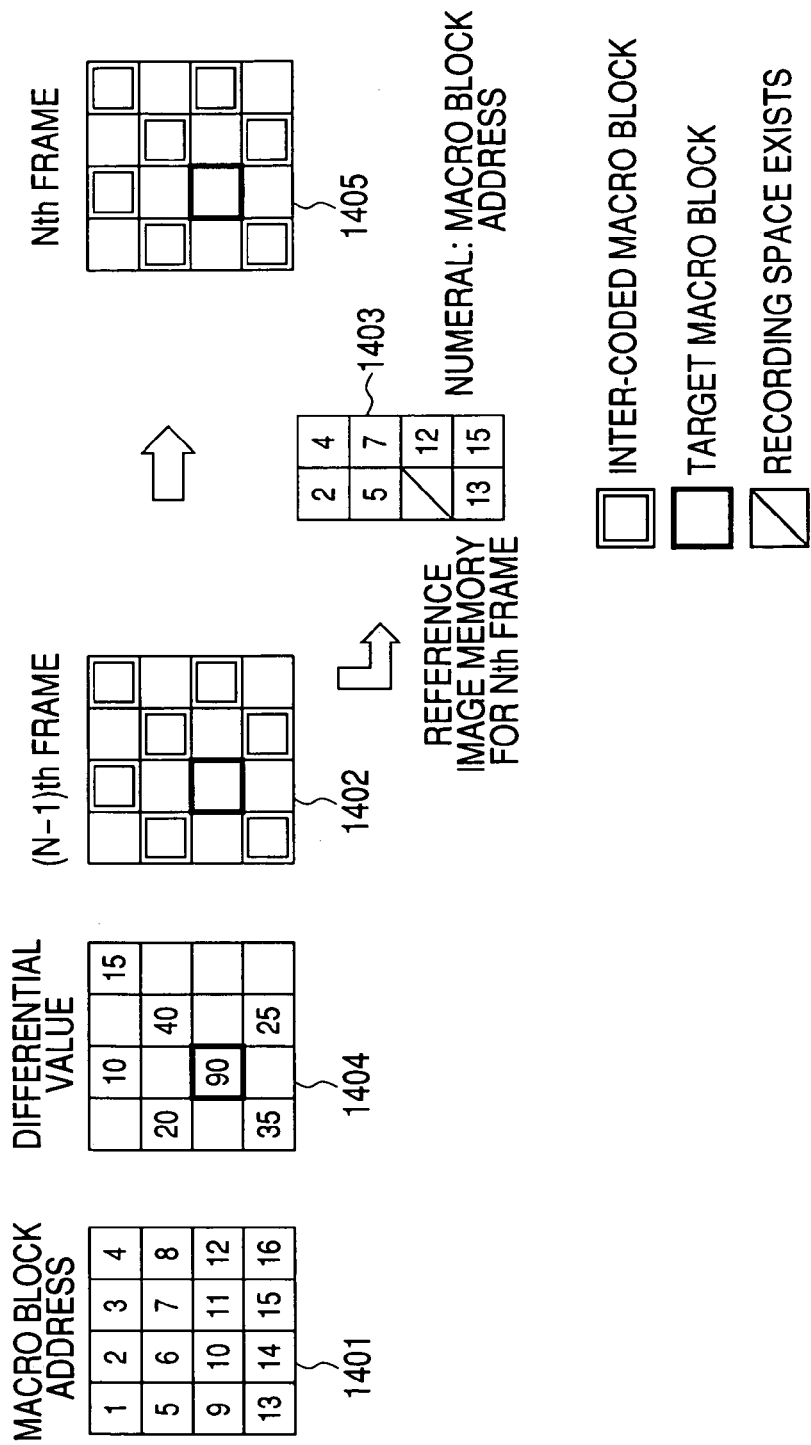
FIG. 14 is an explanatory drawing for explaining moving image coding control for determining a differential value between inter coding macro blocks in the sixth embodiment of the invention.
Figure 15:
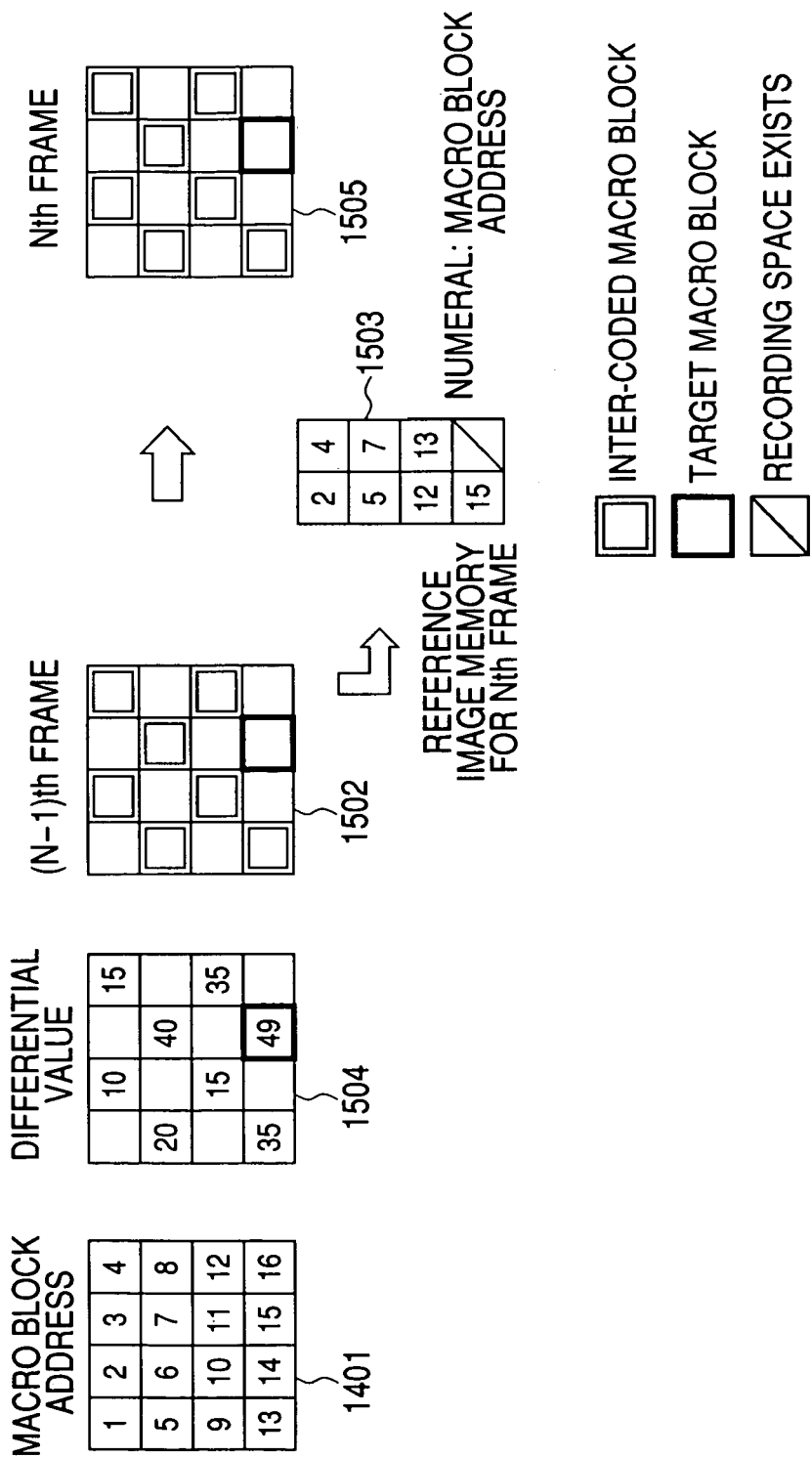
FIG. 15 is an explanatory drawing for explaining moving image coding control for determining a differential value between inter coding macro blocks in the sixth embodiment of the invention.
Figure 16:
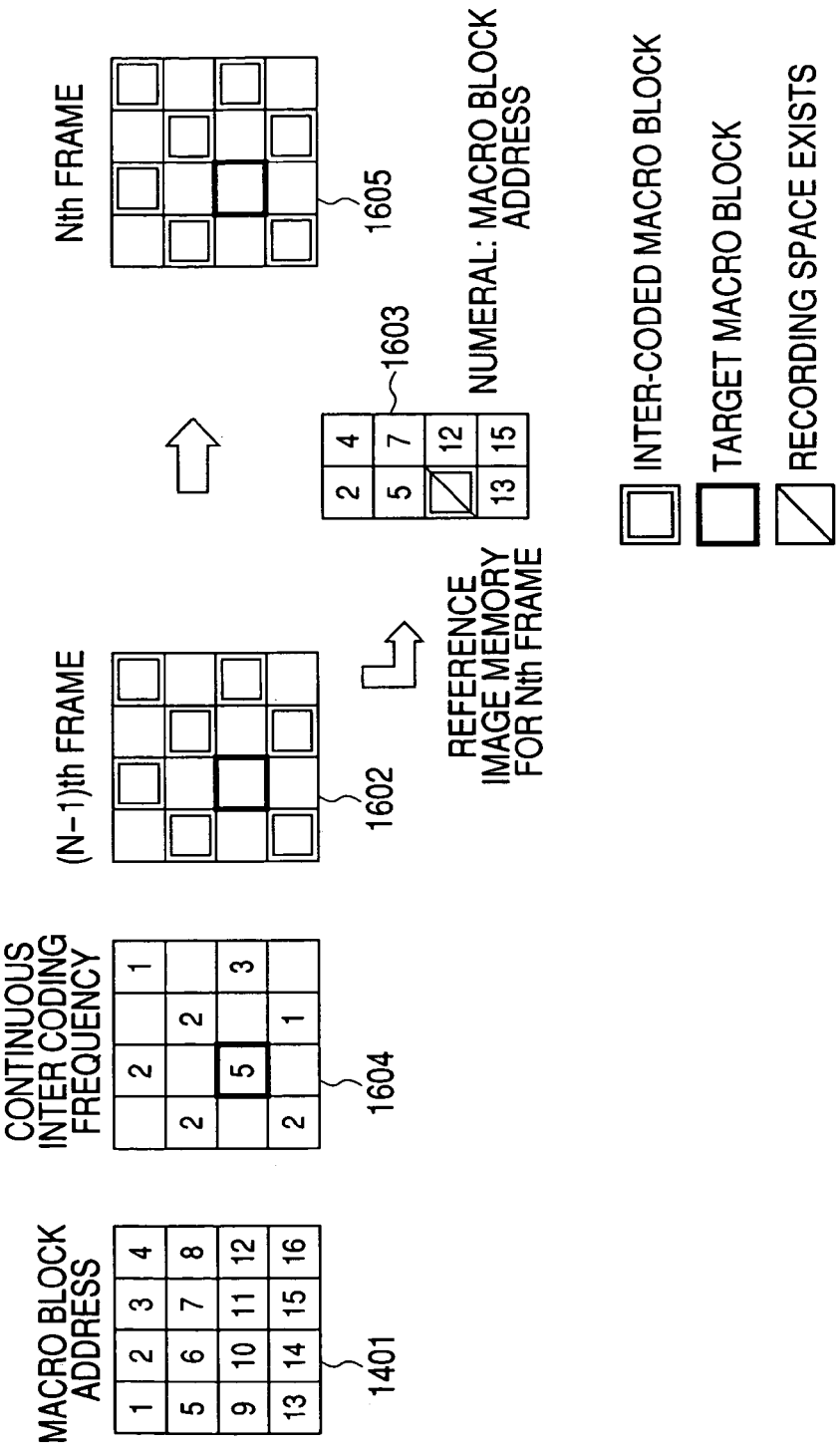
FIG. 16 is an explanatory drawing for explaining moving image coding control for determining a frequency of continuous inter coding in the sixth embodiment of the invention.
Figure 17:
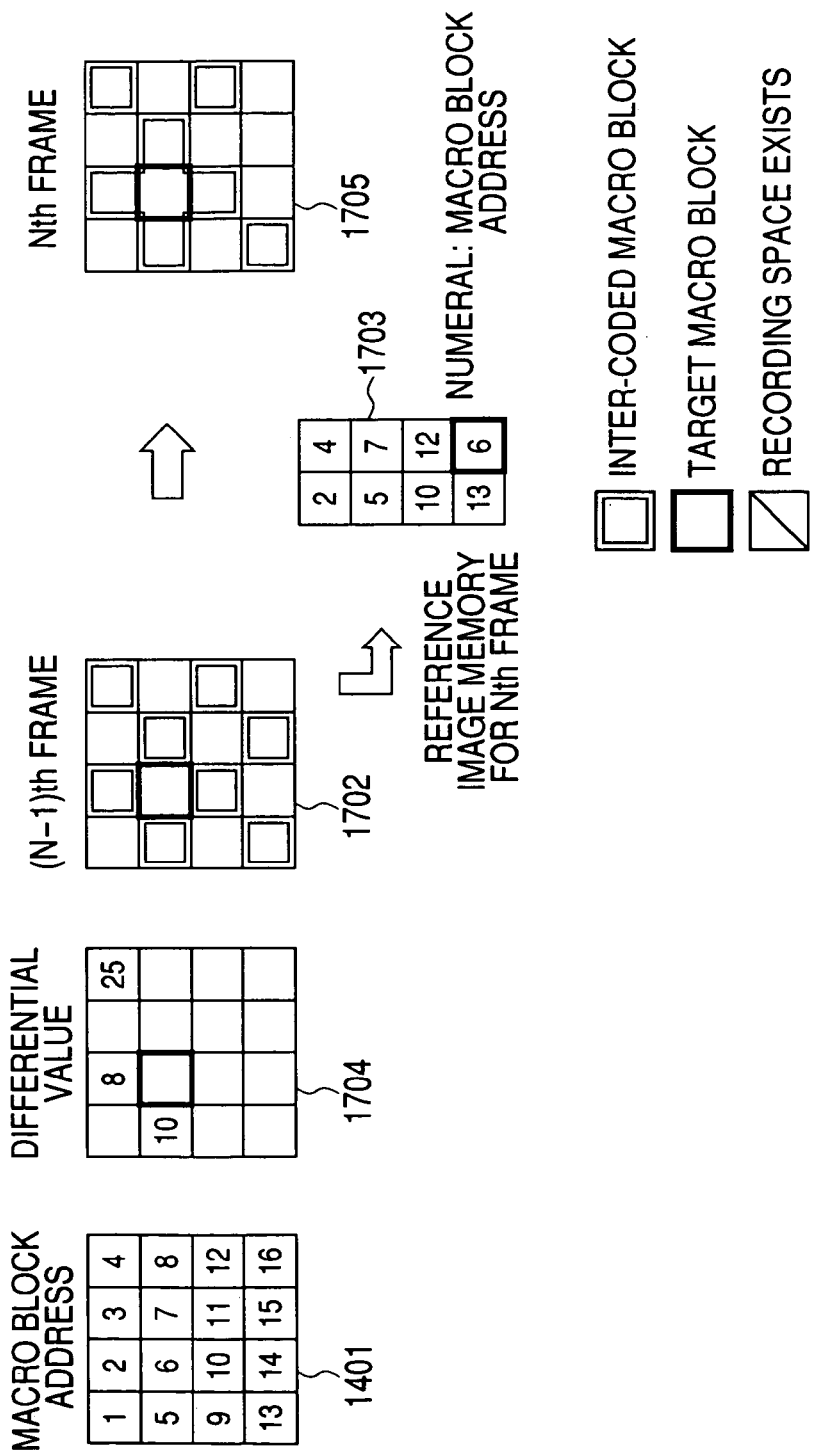
FIG. 17 is an explanatory drawing for explaining moving image coding control for determining a differential value between inter coding macro blocks adjacent to an intra coding macro block in the sixth embodiment of the invention.
Figure 18:
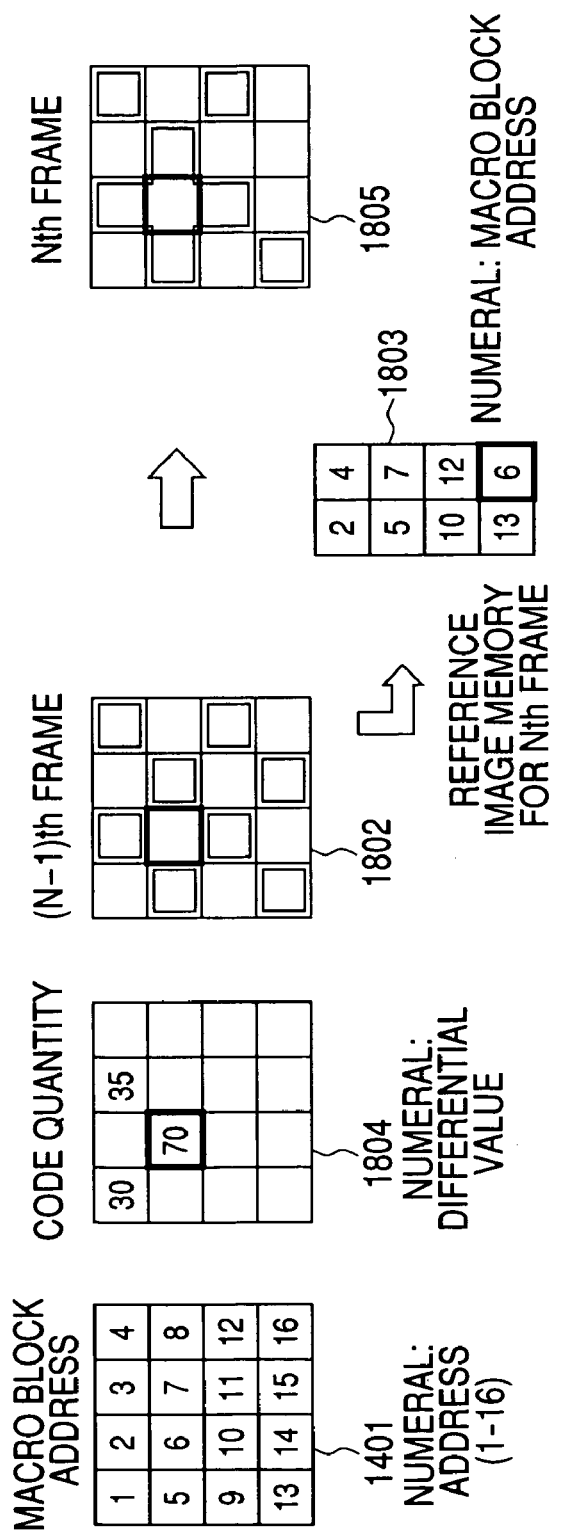
FIG. 18 is an explanatory drawing for explaining moving image coding control for determining the quantity of codes in an intra coding macro block in the sixth embodiment of the invention.
Figure 19:
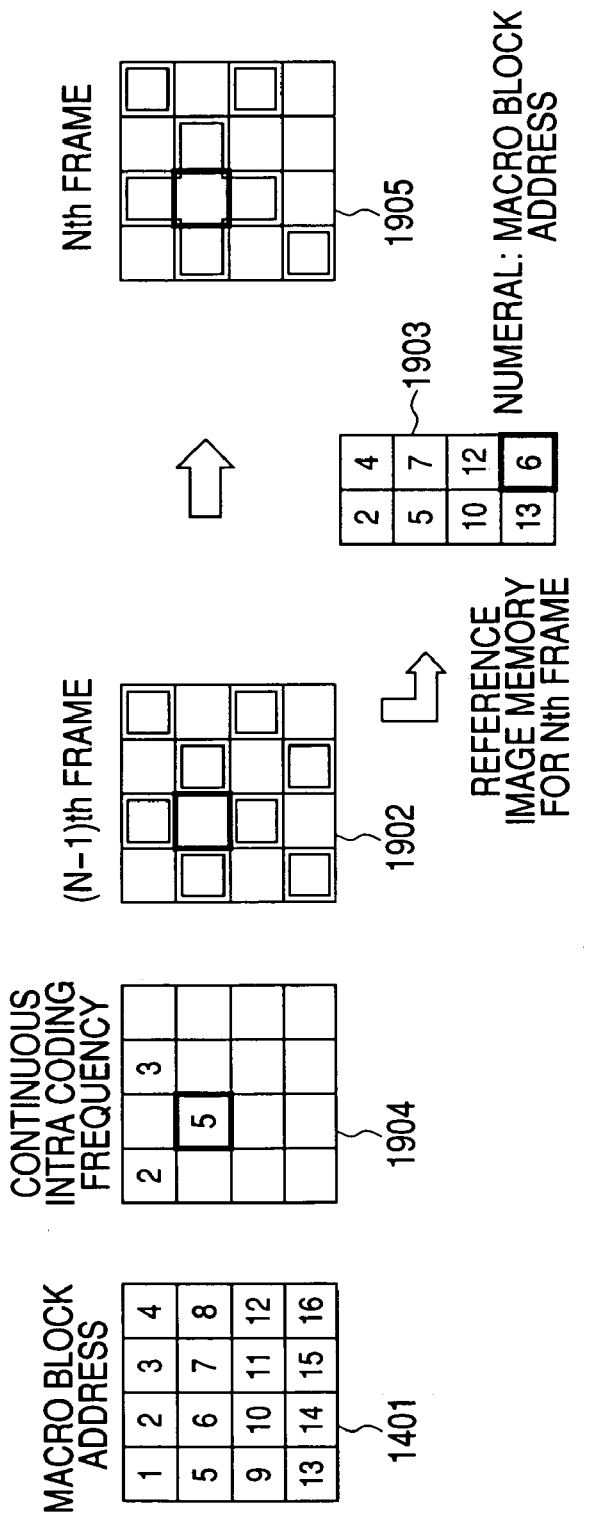
FIG. 19 is an explanatory drawing for explaining moving image coding control for determining a frequency of continuous intra coding in the sixth embodiment of the invention.

In FIGS. 14 to 16, an example that intra coding is instead performed for a macro block in a macro block position for which inter coding is performed in the (N−1)th frame in the Nth frame is shown, and in FIGS. 17 to 19, an example of coding processing that inter coding is instead performed for a macro block in a macro block position for which intra coding is performed in the (N−1)th frame in the Nth frame and coding efficiency is synthetically enhanced in the whole image frame is shown.

In an example 1 shown in FIG. 14, inter coding is also performed for a macro block in a macro block position for which inter coding is normally performed in the (N−1)th frame 1402 in the Nth frame, a reference image 1403 for a macro block for which inter coding is performed in the present image is generated and is recorded into the reference image memory 108. At that time, a differential value shown in 1404 (the sum of differential absolute values adopted as a performance function value) is acquired every macro block by calculating difference between a macro block for which inter coding is performed in the present image frame and its reference image macro block using the difference comparator 1302.

Suppose that the differential threshold (1303) compared with the differential value is 50, coding is executed in order from a macro block in a macro block position 1 in the (N−1)th frame 1402 and a differential value 90 in a macro block position 10 for which inter coding is performed is acquired. As the differential value is larger than the differential threshold 1 as a result of comparison in the difference comparator 1302, intra coding is instead performed for a macro block in the macro block position 10 in the Nth frame 1405.

At this time, as the inter-macro block number counter 1301 up-counts (+1) and indicates that recording space is produced in the reference image memory 108, room that inter coding is instead performed for a macro block in another macro block position for which intra coding is to be performed in the subsequent (N−1)th frame in the Nth frame is produced.

A fact that the differential value of an inter coding macro block is larger than the differential threshold 1 as in the example 1 means that motion in a macro block position is large and as a motion detection error is large and the quantity of codes after coding may increase when inter coding is executed, it can be estimated that the quantity of codes does not greatly increase even if intra coding in which the quantity of codes is generally more than that in inter coding is instead performed for a macro block position.

As free space can be produced in the reference image memory 108 so that inter coding can be instead performed for another intra coding macro block by applying intra coding to an inter coding macro block having large difference with a reference image macro block in the next frame as described above, coding efficiency in the whole image frame can be enhanced.

In an example 2 shown in FIG. 15, inter coding is also performed for a macro block in a macro block position for which inter coding is normally performed in the (N−1)th frame 1502 in the Nth frame, a reference image 1503 of a macro block for which inter coding is performed in the present image is generated and is recorded into the reference image memory 108. At that time, a differential value shown in 1504 is acquired every macro block by calculating difference between an inter coding macro block in the present image frame and its reference image macro block using the difference comparator 1302.

Suppose that the differential threshold 1 (1303) compared with the differential value is 50, coding is executed in order from a macro block in a macro block position 1 in the (N−1)th frame 1502 and a differential value 49 in a macro block position 15 for which inter coding is performed is acquired. As the differential value is close to the differential threshold though the differential value is smaller than the differential threshold 1 as a result of comparison in the difference comparator 1302 and a count value of the inter-macro block number counter 1301 at this time is zero, intra coding is instead performed for a macro block in a macro block position 10 in the Nth frame 1505.

At this time, as the inter-macro block number counter 1301 up-counts (+1) and indicates that recording space is produced in the reference image memory 108, room that inter coding is instead performed for a macro block in another macro block position for which intra coding is to be performed in the subsequent (N−1)th frame in the Nth frame is produced.

In the case the difference with a reference image macro block is close to the differential threshold though the difference is smaller than the differential threshold 1 and it is judged that there is no recording space in the reference image memory, free space can be produced in the reference image memory 108 so that inter coding can be instead performed for another intra coding macro block by applying intra coding to an inter coding macro block in the next frame for the same reason as in the example 1 and coding efficiency in the whole image frame can be enhanced.

In an example 3 shown in FIG. 16, inter coding is also performed for a macro block in a macro block position for which inter coding is normally performed in the (N−1)th frame 1602 in the Nth frame, a reference image 1603 of a macro block for which inter coding is performed in the present image is generated and is recorded into the reference image memory 108. At that time, for an inter coding macro block, a frequency of continuous inter coding every macro block position is acquired as shown in 1604 by counting in the continuous inter coding frequency counter 1305.

Suppose that a threshold 1306 compared with a frequency of continuous inter coding is 5, coding is executed in order from a macro block in a macro block position 1 in the (N−1)th frame 1602 and a frequency of continuous inter coding reaches 5 when the coding of a macro block in a macro block position 10 for which inter coding is performed is finished. As a frequency of continuous inter coding reaches the threshold 1306, intra coding is instead performed for the macro block in the macro block position 10 in the Nth frame 1605.

As in inter coding, coding is executed utilizing temporal redundancy, difference between a present image and a reference image is encoded, however, when an error is superimposed on encoded data in communication, recovery is difficult because the difference is encoded. Therefore, intra coding which does not use difference is performed for a macro block in a macro block position for which inter coding is continuously performed every a few frames and resistance to an error is required to be enhanced.

At this time, as the inter-macro block number counter 1301 up-counts (+1) and indicates that recording space is produced in the reference image memory 108, room that inter coding is instead performed for a macro block in another macro block position for which intra coding is to be performed in the subsequent (N−1)th frame in the Nth frame is produced. Hereby, coding efficiency in the whole image frame can be enhanced.

In an example 4 shown in FIG. 17, in the Nth frame, inter coding is also performed for a macro block in a macro block position for which inter coding is normally performed in the (N−1)th frame 1702, intra coding is also performed for a macro block in a macro block position for which intra coding is performed in the (N−1)th frame in the Nth frame, a reference image 1703 for a macro block for which inter coding is performed in a present image is generated and is recorded into the reference image memory 108. At that time, a differential value shown in 1704 is acquired every macro block position by calculating difference between a macro block for which inter coding is performed in a present image frame and its reference image macro block using the difference comparator 1302.

Suppose that a differential threshold 2 (1303) compared with the differential value is 15 and coding is executed in order from a macro block in a macro block position 1 to a macro block in a macro block position 6 for which intra coding is performed in the (N−1)th frame 1702. Besides, suppose that before coding is started, a count value by the inter-macro block number counter 1301 is positive (+) and there is recording space in the reference image memory 108.

At this time, inter coding is already finished for macro blocks in a macro block position 2 and in a macro block position 5 which are respectively adjacent to a macro block position 6 and for which inter coding is respectively performed and as respective differential values 8 and 10 are smaller than the differential threshold 2, inter coding is instead performed for a macro block in the macro block position 6 in the Nth frame 1705.

Further, its reference image macro block is generated based upon the encoded data of the macro block in the macro block position 6 for which intra coding is performed and is recorded into the reference image memory 108. Therefore, the inter-macro block number counter 1301 down-counts (−1) and one recording space in the reference image memory 108 is reduced.

As it can be judged that the motion of an intra coding macro block the difference with a reference image of a peripheral macro block of which is small is small in consideration of spatial correlation with the peripheral macro block and a motion detection error is small even if inter coding is performed in the next frame, coding efficiency can be enhanced by applying inter coding to a macro block in a macro block position in the next frame instead in the case there is recording space in the reference image memory.

In an example 5 shown in FIG. 18, in the Nth frame, inter coding is also performed for a macro block in a macro block position for which inter coding is normally performed in the (N−1)th frame 1802, intra coding is also performed for a macro block in a macro block position for which intra coding is performed in the Nth frame, a reference image 1803 for a macro block for which inter coding is performed in a present image is generated and is recorded into the reference image memory 108. At that time, the quantity of codes shown in 1804 is acquired every macro block by counting the quantity of codes after intra coding using the code quantity counter 501.

Suppose that a code quantity threshold 502 compared with the quantity of codes after intra coding is 50 and coding is executed in order from a macro block in a macro block position 1 to a macro block in a macro block position 6 for which intra coding is performed in the (N−1)th frame 1802. Besides, suppose that before encoding is started, a count value by the inter-macro block number counter 1301 is positive (+) and there is recording space in the reference image memory 108.

At this time, as the quantity of codes in the macro block position 6 is 70 and is larger than the code quantity threshold, inter coding is instead performed for the macro block in the macro block position 6 in the Nth frame 1805. Further, a reference image macro block is generated based upon the encoded data of the macro block in the macro block position 6 for which intra coding is performed and is recorded into the reference image memory 108. Therefore, the inter-macro block number counter 1301 down-counts (−1) and one recording space in the reference image memory 108 is reduced.

In consideration of temporal correlation, it is judged that the coding efficiency in intra coding in the next frame of a macro block in a macro block position the coding efficiency in intra coding of which is judged to be not satisfactory may be also not satisfactory. Therefore, it can be expected that coding efficiency is enhanced by applying inter coding to the macro block in the macro block position in the next frame.

In an example 6 shown in FIG. 19, in the Nth frame, inter coding is also performed for a macro block in a macro block position for which inter coding is normally performed in the (N−1)th frame 1902, intra coding is also performed for a macro block in a macro block position for which intra coding is performed in the Nth frame, a reference image 1903 for a macro block for which inter coding is performed in a present image is generated and is recorded into the reference image memory 108. At that time, for a macro block for which intra coding is performed, a frequency of continuous intra coding every macro block position is acquired as shown in 1904 by counting in the continuous intra coding frequency counter 1307.

Suppose that the threshold 1308 compared with a frequency of continuous intra coding is 5, coding is executed in order from a macro block in a macro block position 1 in the (N−1)th frame 1902 and a frequency of continuous intra coding reaches 5 when the coding of a macro block position 6 for which intra coding is performed is finished. Besides, suppose that before coding is started, a count value of the inter-macro block number counter 1301 is positive (+) and there is recording space in the reference image memory 108.

At this time, as a frequency of continuous intra coding reaches the threshold 1308, inter coding is instead performed for a macro block in the macro block position 6 in the Nth frame 1905. Further, a reference image macro block is generated based upon the encoded data of the macro block in the macro block position 6 for which intra coding is performed and is recorded into the reference image memory 108. Therefore, the inter-macro block number counter 1301 down-counts (−1) and one recording space in the reference image memory 108 is reduced.

In the case the quantity of codes in intra coding is equal to or less than a code quantity threshold and a macro block for which inter coding is performed is not adjacent in the periphery, intra coding may be continuously performed for a macro block in the macro block position even if the methods shown in the examples 4 and 5 are executed. Then, coding efficiency can be enhanced by monitoring a frequency of continuous intra coding and controlling so that intra coding in which coding efficiency is generally considered to be not satisfactory is not continuous a certain frequency or more.

Seventh Embodiment

In this embodiment, intra coding for valuing image quality is performed for a target to be photographed as in a monitoring camera and inter coding for valuing coding efficiency is performed for the periphery of the target. The application of inter coding to a peripheral macro block means that coding efficiency can be enhanced in the next frame according to circumstances. The specification of an area of the target from an external is enabled.

Figure 20:
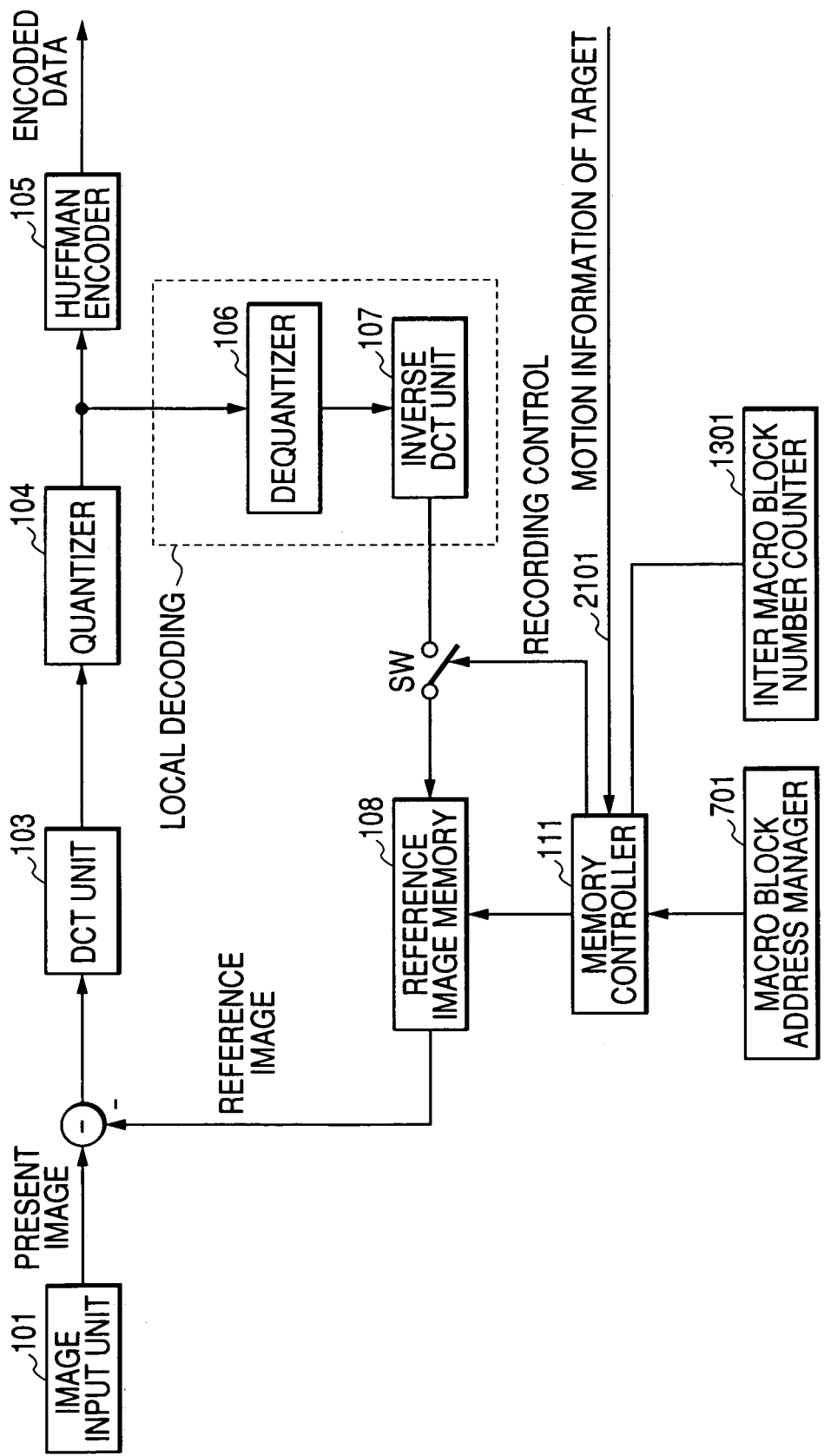
FIG. 20 is a block diagram showing the configuration of a moving image coding apparatus equivalent to a seventh embodiment of the invention.
Figure 21:
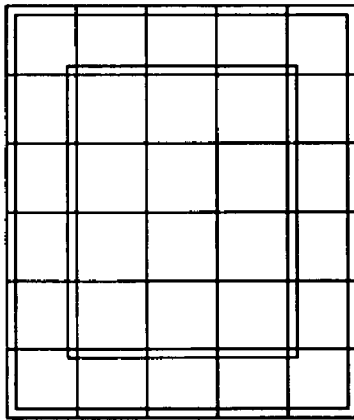
FIG. 21 is an explanatory drawing for explaining moving image coding control in the seventh embodiment of the invention.

FIG. 20 is a block diagram showing the configuration of a moving image coding apparatus equivalent to a seventh embodiment of the invention. In FIG. 20, the same reference number is allocated to the same part as that in the moving image coding apparatus equivalent to the first embodiment and shown in FIG. 1 and in the moving image coding apparatus equivalent to the sixth embodiment and shown in FIG. 13. As shown in FIG. 20, a reference number 2001 denotes a signal for inputting the motion information of the target from an external.

FIGS. 21 to 25 are explanatory drawings for explaining moving image coding control in this embodiment. In this embodiment explained in these drawings, as like 2101 showing a macro block position (a macro block address), an image frame is configured by 30 macro blocks (lateral 6 pieces×vertical 5 pieces). A reference image memory 108 has capacity enough to record 18 reference image macro blocks.

Suppose that in the (N−1)th frame 2102, a target area to be intra-coded is a group of 12 macro blocks (macro block positions are 8 to 11, 14 to 17, 20 to 23) in the center and 18 reference image macro blocks in macro block positions to be inter-coded in the periphery of the target area are recorded into a reference image memory 108 as shown in a reference image 2103.

Figure 22:
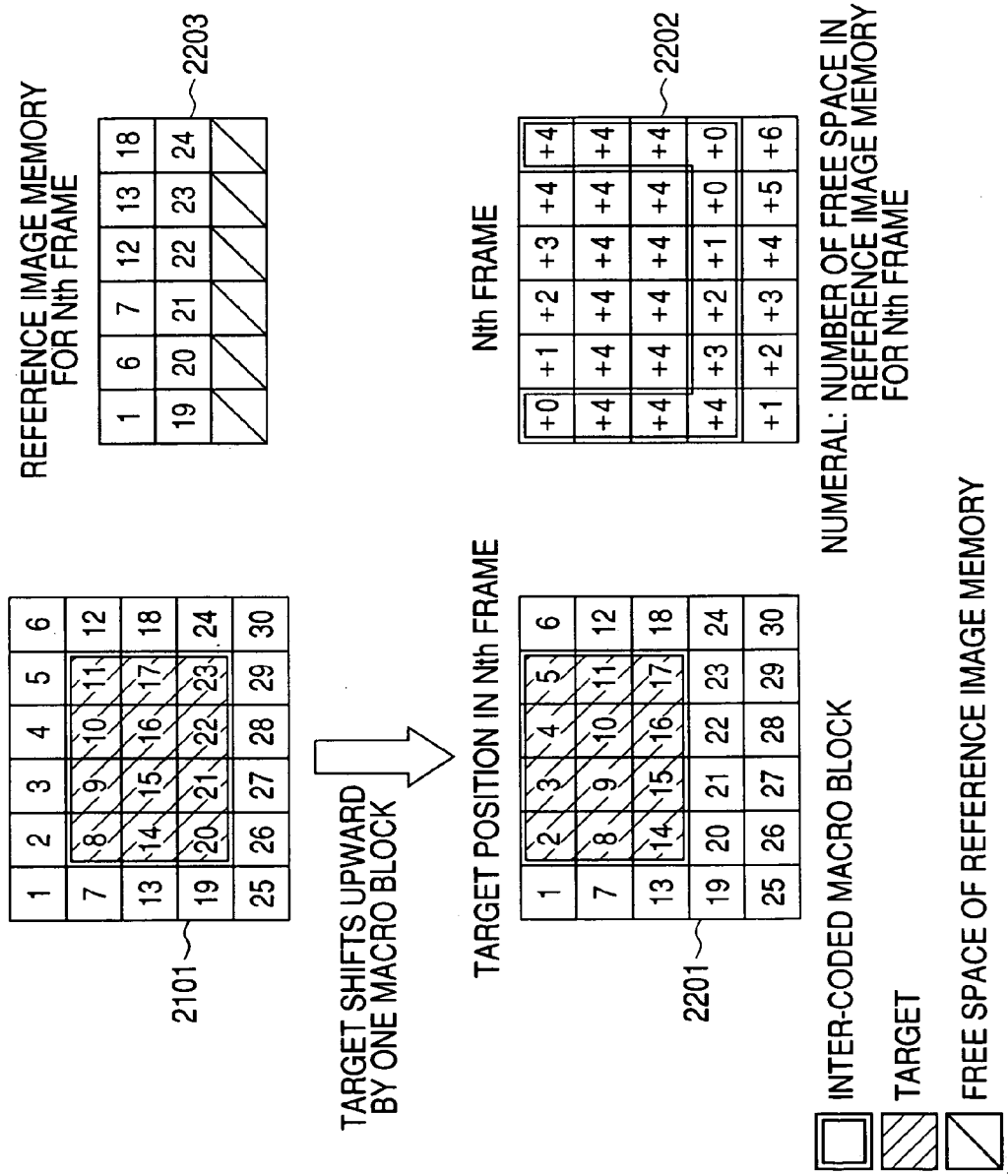
FIG. 22 is an explanatory drawing for explaining moving image coding control in the case a target shifts upward in the seventh embodiment of the invention.

FIG. 22 is an explanatory drawing for explaining moving image coding control in the case it is judged based upon the motion information 2001 of a target input from an external in the coding of the (N−1)th frame 2102 that the target shifts by one macro block upward.

As the target is predicted to shift as shown in 2201 showing a macro block position (a macro block address) in the Nth frame, it is first determined in the coding of the (N−1)th frame 2102 that intra coding is instead performed for macro blocks in macro block positions 2 to 5 in the Nth frame 2202 in the Nth frame 2202 and reference image macro blocks in the macro block positions 2 to 5 are not recorded into the reference image memory 108.

Next, it is determined that inter coding is instead performed for macro blocks in macro block positions 20 to 23 in the Nth frame 2202 and reference image macro blocks in the macro block positions 20 to 23 are recorded into recording space in which no reference image macro blocks in the macro block positions 2 to 5 are recorded into the reference image memory 108.

The same type of processing is described together above, however, actually, coding is executed in the order of macro block positions and a reference image 2203 for the Nth frame is prepared with the normal processing of macro blocks for which inter coding is performed and the above-mentioned processing together. A numeral in the Nth frame 2202 denotes the transition of count values by an inter-macro block number counter 1301 in the coding of the (N−1)th frame 2102. It is known that control is made so that a count value is not negative.

For macro blocks in macro block positions 25 to 30 outside the periphery of the target area in the Nth frame, it is desirable that free space is secured in the reference image memory by intra coding as shown in the Nth frame 2202.

Figure 23:
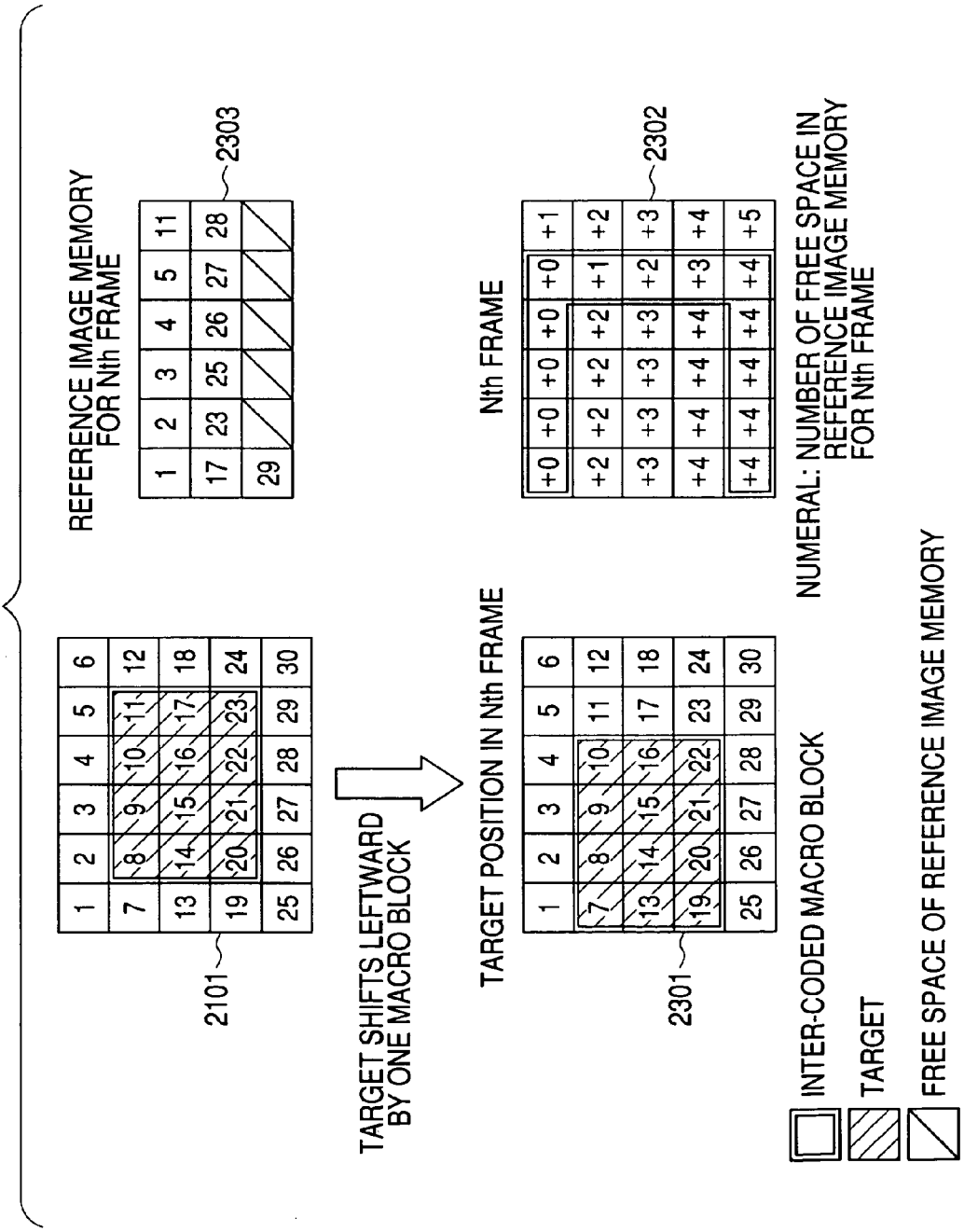
FIG. 23 is an explanatory drawing for explaining moving image coding control in the case the target shifts leftward in the seventh embodiment of the invention.

FIG. 23 is an explanatory drawing for explaining moving image coding control in the case it is judged based upon the motion information 2001 of a target input from an external that the target shifts by one macro block leftward in the coding of the (N–1)th frame 2102.

As the target is predicted to shift as like 2301 showing a macro block position (a macro block address) in the Nth frame, it is first determined in the coding of the (N–1)th frame 2102 that intra coding is instead performed for macro blocks in macro block positions 7, 13, 19 in the Nth frame 2302 and reference image macro blocks in the macro block positions 7, 13, 19 are not recorded into the reference image memory 108.

Next, it is determined that inter coding is instead performed for macro blocks in macro block positions 11, 17, 23 in the Nth frame 2302 and reference image macro blocks in the macro block positions 11, 17, 23 are recorded into recording free space in which reference image macro blocks in the macro block positions 7, 13, 19 are not recorded into the reference image memory 108.

The same type of processing is described together above, however, actually, coding is executed in the order of macro block positions and a reference image 2303 for the Nth frame is prepared by the normal processing of macro blocks for which inter coding is performed and the above-mentioned processing. A numeral in the Nth frame 2302 denotes the transition of count values by the inter-macro block number counter 1301 in the coding of the (N–1)th frame 2102. In this case, it is also known that control is made so that a count value is not negative.

For macro blocks in macro block positions 6, 12, 18, 24, 30 outside the periphery of the target area in the Nth frame, it is desirable that free space is prepared in the reference image memory by intra coding as shown in the Nth frame 2302.

Figure 24:
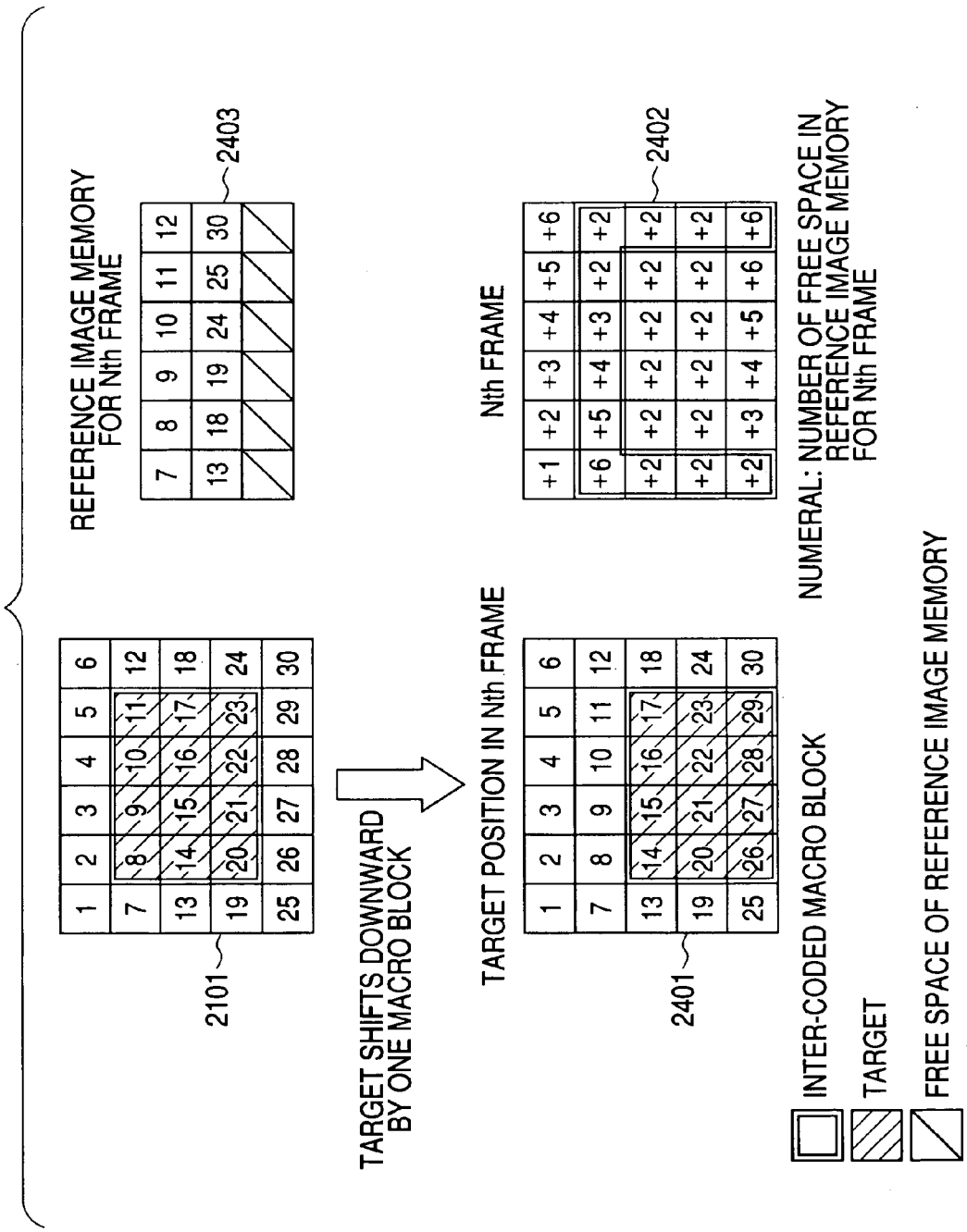
FIG. 24 is an explanatory drawing for explaining moving image coding control in the case the target shifts downward in the seventh embodiment of the invention.

FIG. 24 is an explanatory drawing for explaining moving image coding control in the case it is judged based upon the motion information 2001 of the target input from an external in the coding of the (N–1)th frame 2102 that the target shifts by one macro block downward.

As the target is predicted to shift as like 2401 showing a macro block position (a macro block address) in the Nth frame, it is first determined in the coding of the (N–1)th frame 2102 that intra coding is instead performed for macro blocks in macro block positions 1 to 6 outside the periphery of the target area in the Nth frame 2402 and reference image macro blocks in the macro block positions 1 to 6 are not recorded into the reference image memory 108.

Next, it is determined that inter coding is instead performed for macro blocks in macro block positions 8 to 11 in the Nth frame 2402 and reference image macro block in the macro block positions 8 to 11 are recorded into recording free space in which no reference image macro blocks in the macro block positions 1 to 6 are recorded into the reference image memory 108.

Further, it is determined that intra coding is instead performed for macro blocks in macro block positions 26 to 29 in the Nth frame 2402 and reference image macro blocks in the macro block positions 26 to 29 are not recorded into the reference image memory 108.

The same type of processing is determined together above, however, actually, coding is executed in the order of macro block positions and a reference image 2403 for the Nth frame is prepared by the normal processing of macro blocks for which inter coding is performed and the above-mentioned processing. A numeral in the Nth frame 2302 denotes the transition of count values by the inter-macro block number counter 1301 in the coding of the (N–1)th frame 2102. In this case, it is also known that control is made so that a count value is not negative.

Figure 25:
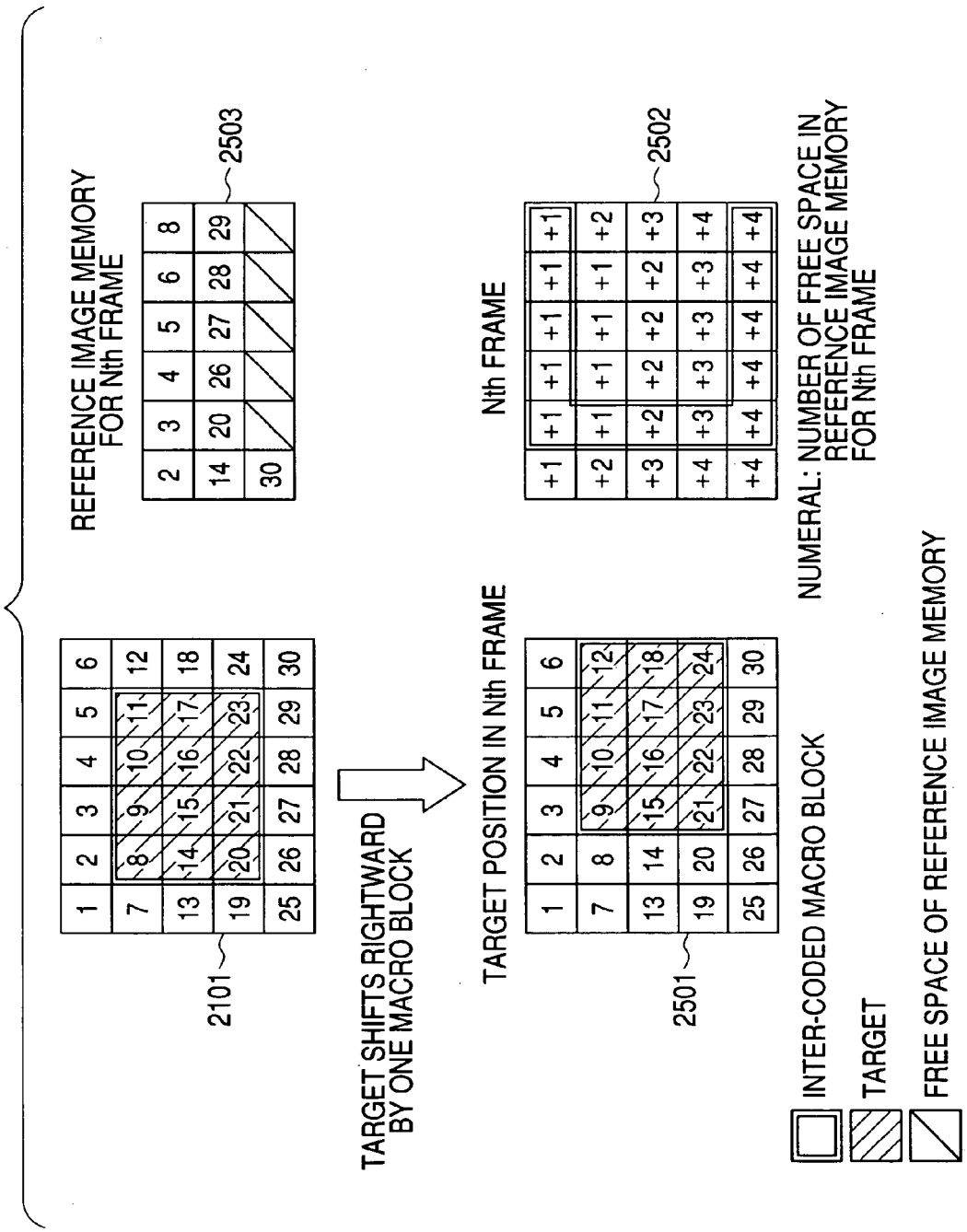
FIG. 25 is an explanatory drawing for explaining moving image coding control in the case the target shifts rightward in the seventh embodiment of the invention.

FIG. 25 is an explanatory drawing for explaining moving image coding control in the case it is judged based upon the motion information 2001 of a target input from an external in the coding of the (N–1)th frame 2102 that the target shifts by one macro block rightward.

As the target is predicted to shift in the Nth frame as like 2501 showing a macro block position (a macro block address), it is first determined in the coding of the (N–1)th frame 2102 that intra coding is instead performed for macro blocks in macro block positions 1, 7, 13, 19, 25 in the Nth frame 2502 and reference image macro blocks in the macro block positions 1, 7, 13, 19, 25 are not recorded into the reference image memory 108.

Next, it is determined that inter coding is instead performed for macro blocks in macro block positions 8, 14, 20 in the Nth frame 2502 and reference image macro blocks in the macro block positions 8, 14, 20 are recorded into recording free space in which no reference image macro blocks in the macro block positions 1, 7, 13, 19, 25 are recorded into the reference image memory 108.

Further, it is determined that intra coding is instead performed for macro blocks in macro block positions 12, 18, 24 in the Nth frame 2502 and no reference image macro blocks in the macro block positions 12, 18, 24 are recorded into the reference image memory 108.

The same type of processing is described together above, however, actually, coding is executed in the order of macro block positions and a reference image for the Nth frame 2503 is prepared by the normal processing of macro blocks for which inter coding is performed and the above-mentioned processing. A numeral in the Nth frame 2502 denotes the transition of count values by the inter-macro block number counter 1301 in the coding of the (N–1)th frame 2102. In this case, it is also known that control is made so that a count value is not negative.

According to this embodiment, moving image coding that image quality is valued for a target to be photographed and coding efficiency is valued in the periphery of the target is enabled. Moving image coding when the target diagonally shifts is also enabled by executing coding in the combination of upward, downward, rightward and leftward four shift patterns described above.

Eighth Embodiment

In this embodiment, moving image coding according to prior art is performed for an image in image size within the capacity of a reference image memory, and for an image in image size larger than the capacity of the reference image memory, moving image coding the image size of which is free is enabled by limiting the number of maximum macro blocks for which inter coding is performed in one image frame and executing moving image coding using the same reference image memory.

Figure 26:
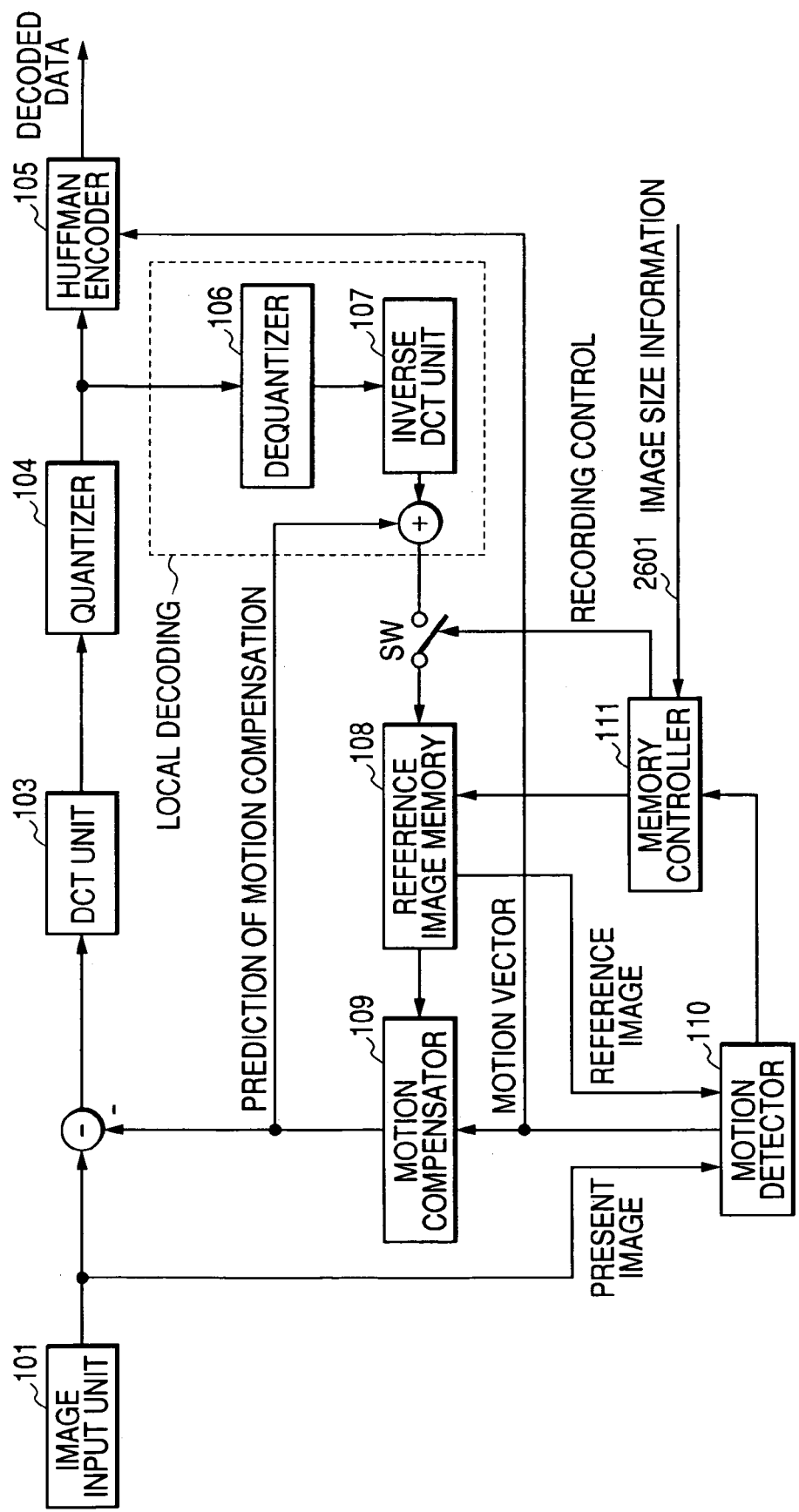
FIG. 26 is a block diagram showing the configuration of a moving image coding apparatus equivalent to an eighth embodiment of the invention.

FIG. 26 is a block diagram showing the configuration of a moving image coding apparatus equivalent to an eighth embodiment of the invention. In FIG. 26, the same reference number is allocated to the same part as that in the moving image coding apparatus equivalent to the first embodiment and shown in FIG. 1. As shown in FIG. 26, a reference number 2601 denotes a signal for inputting image size information from an external to a memory controller 111.

Figure 27:
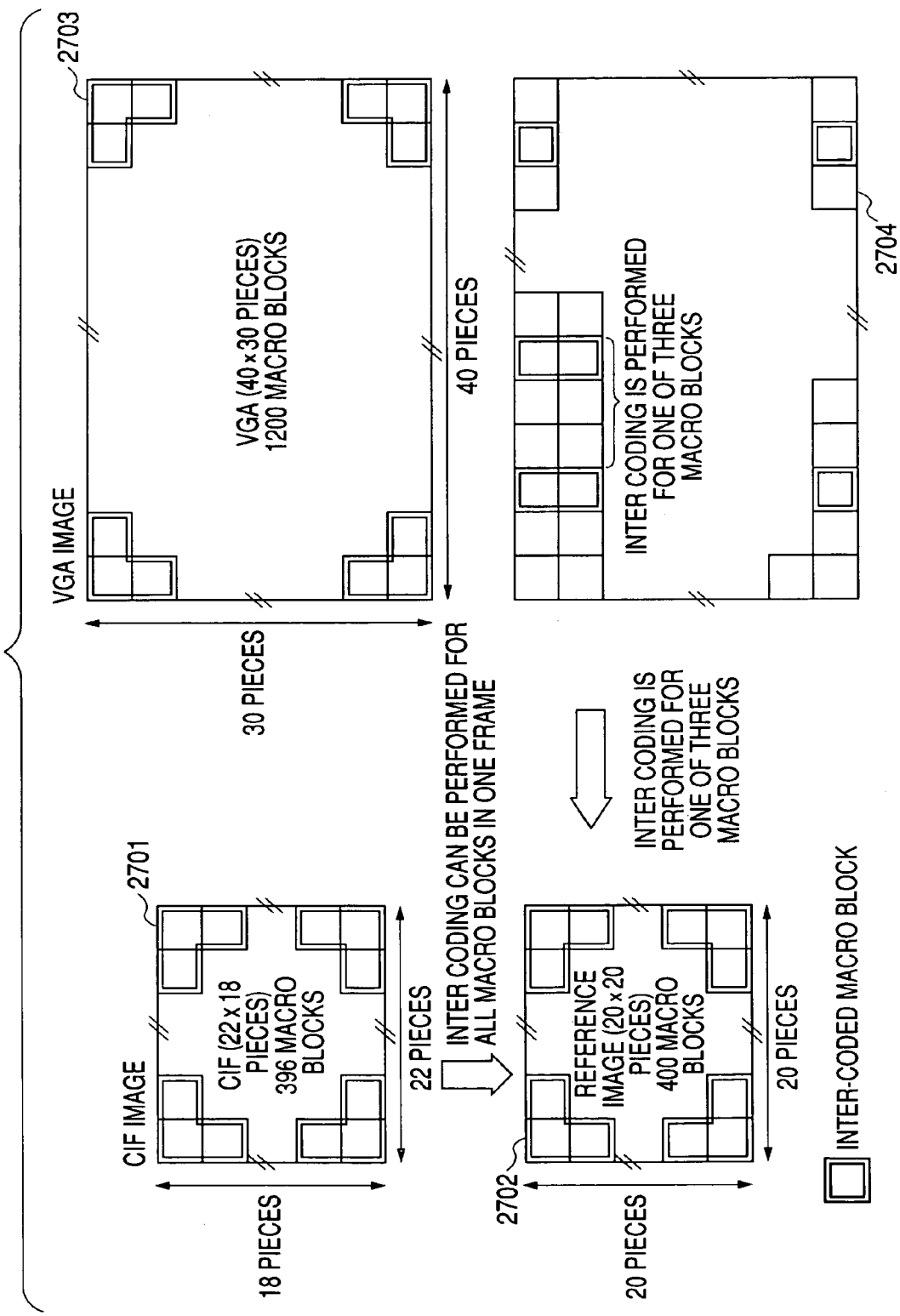
FIG. 27 is an explanatory drawing for explaining moving image coding control in the eighth embodiment of the invention.

FIG. 27 is an explanatory drawing for explaining moving image coding control in this embodiment. In FIG. 27, the embodiment for the moving image coding of a CIF image 2701 and the moving image coding of a VGA image 2703 using a reference image memory 108 which can record 400 reference image macro blocks is shown. The embodiment is an example for explanation and does not specify image size.

As inter coding can be performed for all macro blocks (396 pieces) of a CIF image 2701 in the case CIF image size is specified by image size information 2601, conventional moving image coding in which the number of maximum macro blocks for which inter coding is performed in one image frame is not limited is executed.

As the number of macro blocks is 1200 as shown in a VGA image 2703 in the case VGA image size is specified by the image size information 2601, inter coding is performed for one per three macro blocks as shown in a VGA image frame 2704, intra coding is performed for the other macro blocks and moving image coding is enabled by recording only reference image macro blocks in macro block positions for which inter coding is performed in the next frame in the reference image memory 108.

According to this embodiment, moving image coding of plural image sizes using the same reference image memory is enabled by controlling the ratio of macro blocks for which inter coding is performed according to image size information.

Ninth Embodiment

As described in the fourth embodiment, as it is considered that the halt of the function of motion compensation has little effect because the precision of motion detection and motion compensation is greatly deteriorated in the case reference images are small or no reference image exists in adjacent macro block positions, the configuration of a moving image coding apparatus in which moving image coding is simplified as shown in FIG. 9 is shown.

In this embodiment, energy saving and processing efficiency are enhanced according to a situation of a photographed moving image by controlling so that the halt of a motion compensation function can be selected in addition to the above-mentioned method.

Figure 28:
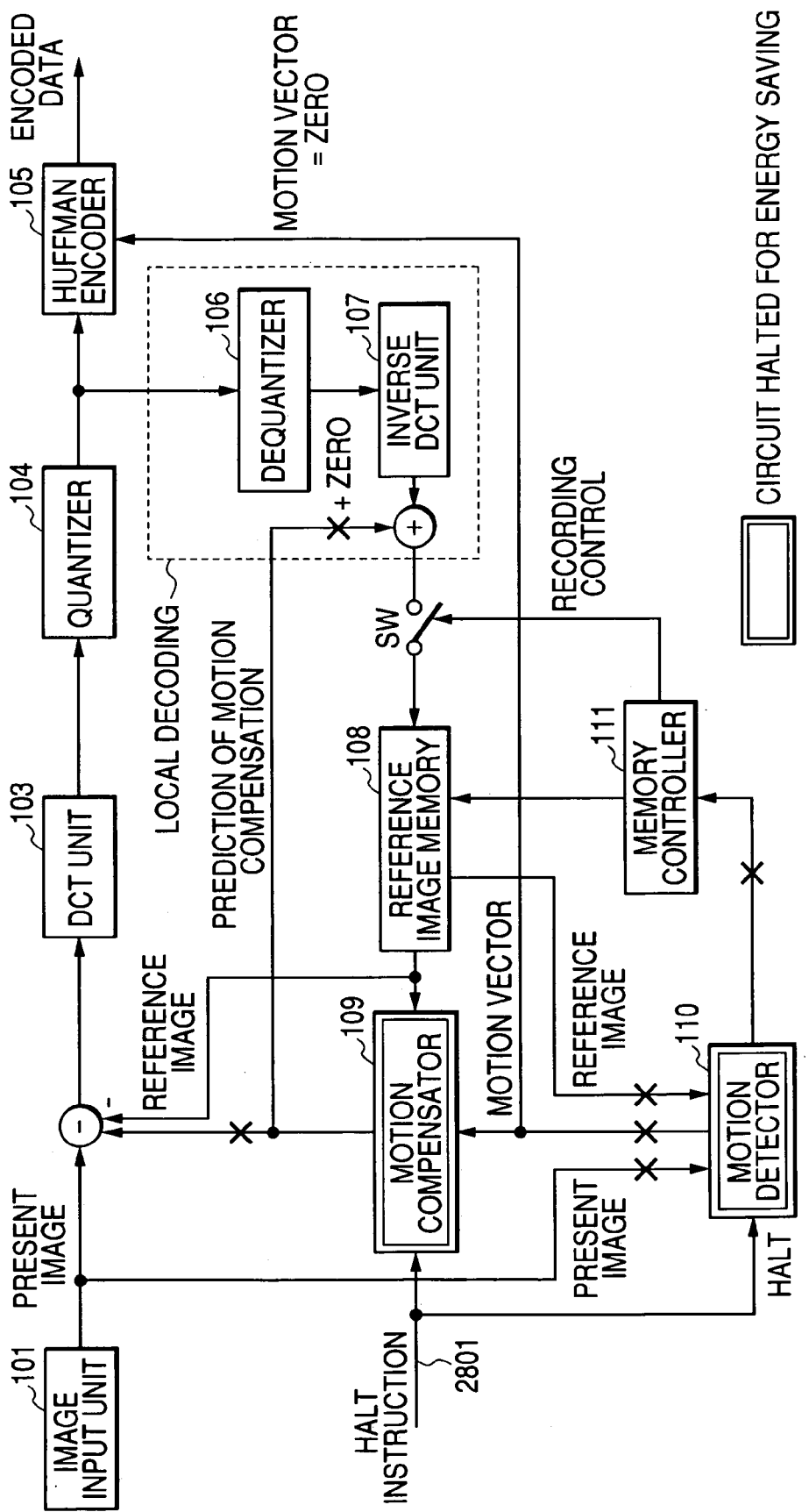
FIG. 28 is a block diagram showing the configuration of a moving image coding apparatus equivalent to a ninth embodiment of the invention.

FIG. 28 is a block diagram showing the configuration of the moving image coding apparatus equivalent to a ninth embodiment of the invention. In FIG. 28, the same reference number is allocated to the same part as that in the moving image coding apparatus equivalent to the first embodiment and shown in FIG. 1.

In FIG. 28, a motion compensation halt instruction signal 2801 input to a motion compensator 109 and a motion detector 110 is added to the configuration shown in FIG. 1. In the case the motion compensation halt instruction signal 2801 is issued, the motion compensator 109 and the motion detector 110 halt the operation and in the case of inter coding, a reference image is directly provided as a predictive image based upon difference with a present image.

Hereby, even if the motion compensator 109 and the motion detector 110 are halted according to a halt instruction from an external, moving image coding is enabled and power consumption can be reduced by halting an unnecessary circuit.

Tenth Embodiment

The object of this embodiment is to record a frequency of past inter coding every macro block position as a history, to determine coding division every macro block position referring to the frequency when each setting is initialized in restarting and to improve image quality and coding efficiency.

Figure 29:
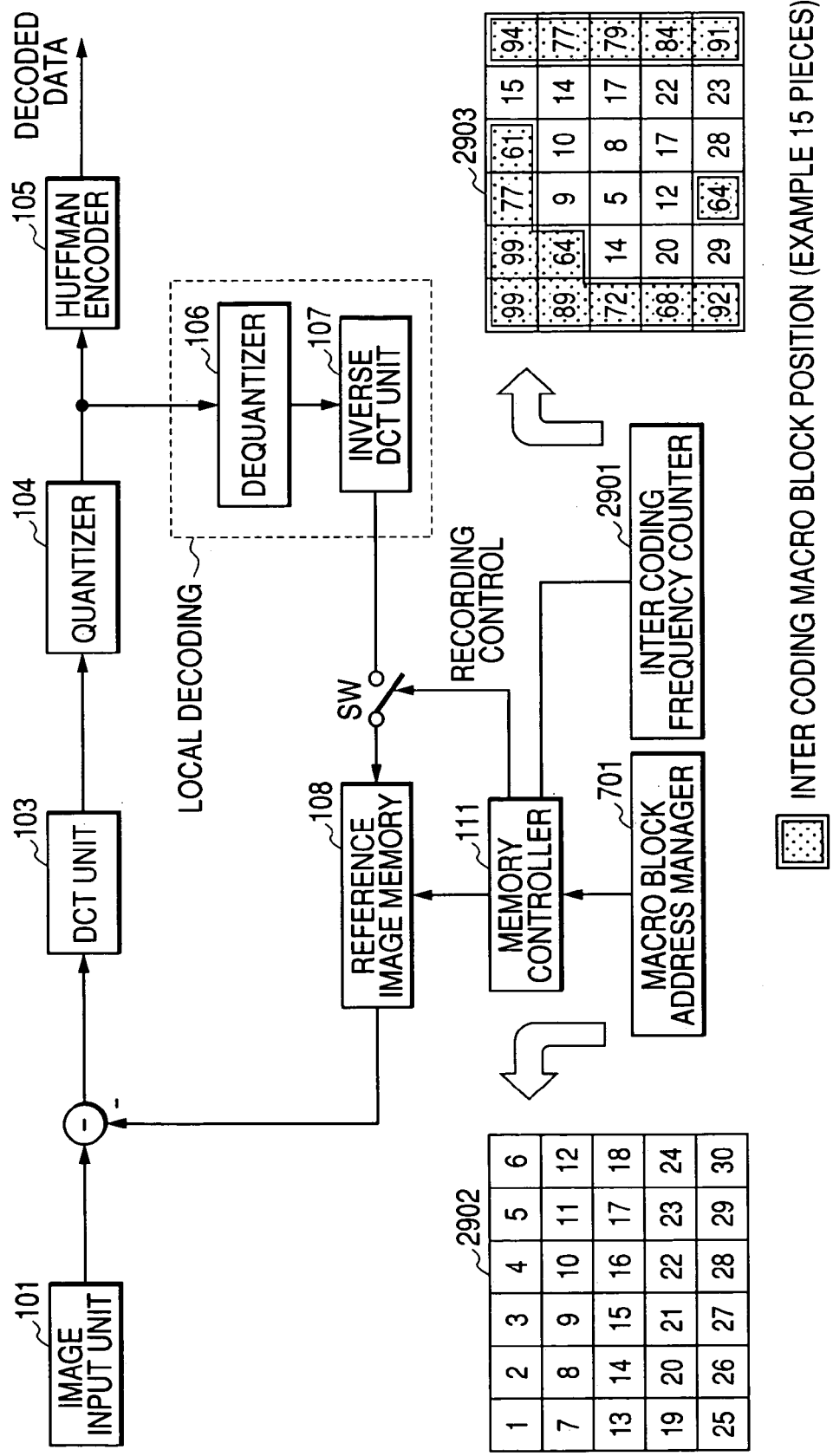
FIG. 29 is a block diagram showing the configuration of a moving image coding apparatus equivalent to a tenth embodiment of the invention.

FIG. 29 is a block diagram showing the configuration of a moving image coding apparatus equivalent to a tenth embodiment of the invention. In FIG. 29, the same reference number is allocated to the same part as that in the moving image coding apparatus equivalent to the first embodiment and shown in FIG. 1 and in the moving image coding apparatus equivalent to the fourth embodiment and shown in FIG. 7.

In the configuration shown in FIG. 29, an inter coding frequency counter 2901 is provided to count and record a frequency of past inter coding every macro block position. A memory controller 111 refers to the inter coding frequency counter 2901 when each setting is initialized in restarting and determines so that inter coding is previously performed for a macro block in a macro block position in which inter coding is more frequent in order.

As shown in FIG. 29, an image frame is configured by 30 macro blocks as shown in 2902 showing a macro block position (a macro block address) and 2903 shows a frequency of inter coding every macro block position recorded into the inter coding frequency counter 2901.

When the moving image coding apparatus is restarted, intra coding is performed for all macro blocks in a first frame after restarting. For the coding division of macro block positions in a second frame determined in the coding, a frequency of inter coding 2903 every macro block position is referred and when the capacity of a reference image recording memory 108 is equivalent to a half of the capacity of an image frame, 15 macro blocks in macro block positions in which inter coding is more frequent are selected and the macro block positions for which inter coding is performed are determined. Hereby, image quality and coding efficiency in frames subsequent to the second frame immediately after activation can be improved.

As in the case of a monitoring camera fixed outside, a macro block position in which motion is regularly large and a macro block position in which motion is regularly small exist though the effect of this method is small in a moving camera, inter coding is often performed for a macro block in the macro block position in which motion is regularly small and satisfactory effect can be expected because the application of inter coding to macro blocks in such macro block positions is frequent.

This method is particularly effective in the fixed outside monitoring camera, however, in a moving camera such as a mobile telephone provided with a camera, the effect of this method cannot be expected because the change of temporal correlation of an image is large. Therefore, it is desirable that the moving image coding apparatus is provided with a function for selecting whether this function is to be made effective or not and whether a frequency of inter coding is to be stored or not.

As described above, according to the above-mentioned embodiments, reference images of all macro blocks in a current frame are not required to be prepared by determining macro block positions for which intra coding or inter coding is performed in the coding of an image prior to the present image, the capacity of the reference image memory can be reduced and the cost of the moving image coding apparatus can be reduced.

What is claimed is:

1. A moving image coding method for coding a moving image, every macro block which forms a predetermined area of a present image, with using intra coding in which image data are orthogonal-transformed, and then image data after the orthogonal-transformation are quantized and variable-length coded, and inter coding in which a motion vector of the present image relative to a reference image is detected, motion compensation for the reference image with using the motion vector is performed, differential data between the present image and the reference image after the motion compensation are orthogonal-transformed, and then differential data after the orthogonal transformation are quantized and variable-length coded, and for storing, for purpose of the inter coding, a reference image of image frame next to the present image generated by inverse-quantizing and inverse-orthogonal-transforming image data after the quantization or differential data after the quantization in a reference image memory, comprising the step of:

determining position of a macro block which is intra-coded or inter-coded, in a range of the maximum number of macro blocks inter-coded in one image frame, when an image (Mth frame M≦N−1) prior to a present image (Nth frame) is coded.

2. A moving image coding method according to claim 1, wherein macro blocks in a reference image of the next image frame, for only position of which is determined to perform the inter coding, are stored in the reference image memory.

3. A moving image coding method according to claim 1, wherein the maximum number of macro blocks which is inter-coded is below the number of macro blocks configuring an image frame.

4. A moving image coding method according to claim 1, wherein the maximum number of macro blocks which is inter-coded is suitably determined based upon available capacity of the reference image memory.

5. A moving image coding method according to claim 1, wherein the orthogonal transformation is a discrete cosine transform (DCT).

6. A moving image coding method according to claim 1, wherein the variable-length coding is Huffman coding.

7. A moving image coding method according to claim 1, wherein position of a macro block which is intra-coded or inter-coded in Nth frame is determined based upon at least one of evaluations of image information and code quantity at a time of coding of an image in or prior to (N−1)th frame.

8. A moving image coding method according to claim 1, wherein position of a macro block which is intra-coded or inter-coded in Nth frame is determined in or prior to (N−1)th fame by an external.

9. A moving image coding method according to claim 1, wherein the macro block is intra-coded based on an instruction for stopping inter coding at a time of coding of macro block identically positioned in a macro block for which inter coding is determined to be performed in or prior to (N−1)th frame.

10. A moving image coding method according to claim 1, wherein position of a macro block which is intra-coded or inter-coded in Nth frame is determined based upon at least one of evaluations of image information and total code quantity of all macro blocks in (N−2)th frame at a time of coding of (N−1)th frame.

11. A moving image coding method according to claim 1, wherein position of a macro block which is intra-coded or inter-coded in Nth frame is determined based upon at least one of evaluations of image information and code quantity of every macro block in (N−1)th frame.

12. A moving image coding method according to claim 1, wherein macro blocks which is intra-coded or inter-coded is provided in a form of a pattern having staggered arrangement.

13. A moving image coding method according to claim 1, wherein in a case that it is determined to perform inter coding for macro blocks to be encoded and it is determined to perform intra coding for macro blocks equal to or more than a predetermined number and adjacent to the macro blocks to be encoded, inter coding is performed for the macro blocks to be encoded with zero as the motion vector.

14. A moving image coding method according to claim 1, wherein it is selected in inter coding whether motion compensation is performed or not.

15. A moving image coding method according to claim 1, wherein position information of macro blocks stored in the reference image memory is held.

16. A moving image coding method according to claim 1, wherein in the case evaluation function value calculated based upon difference between a macro block identically positioned in a macro block for which inter coding is performed in (N−1)th frame and a macro block of its reference image is larger than a predetermined threshold, intra coding is performed, in Nth frame, for the macro block identically positioned in the macro block for which the inter coding is performed in the (N−1)th frame.

17. A moving image coding method according to claim 1, wherein in a case the number of macro blocks stored in the reference image memory is equal to the maximum number of macro blocks for which inter coding is performed, intra coding is performed for a macro block, which is positioned in a subsequent macro block, in the next image frame.

18. A moving image coding method according to claim 1, wherein in the case a frequency of continuous inter coding for macro blocks identically positioned in a macro block for which inter coding is performed in (N−1)th frame is larger than a predetermined threshold, intra coding is performed for a macro block identically positioned in the macro block for which the inter coding is performed in the (N−1)th frame in Nth frame.

19. A moving image coding method according to claim 1, wherein in the case evaluation function value calculated based upon difference between a inter-coded macro block adjacent to a macro block for which is intra-coded in (N−1)th frame and a macro block of its reference image is smaller than the predetermined threshold and the number of macro blocks stored in the reference image memory is smaller than the number of the maximum number of macro blocks which can be stored in the reference image memory, inter coding is performed, in Nth frame, for the macro block identically positioned in the macro block for which the intra coding is performed in the (N−1)th frame.

20. A moving image coding method according to claim 1, wherein
in the case code quantity of a macro block for which intra coding is performed in (N−1)th frame is more than a predetermined threshold and the number of macro blocks stored in the reference image memory is smaller than the maximum number of macro blocks which can be stored in the reference image memory, inter coding is performed, in Nth frame, for the macro block identically positioned in the macro block for which the intra coding is performed in the (N−1)th frame.

21. A moving image coding method according to claim 1, wherein
in the case a frequency of continuous intra coding for macro block identically positioned in a macro block for which intra coding is performed in (N−1)th frame is larger than a predetermined threshold and the number of macro blocks stored in the reference image memory is smaller than the maximum number of macro blocks which can be stored in the reference image memory, inter coding is performed, in Nth frame, for the macro block identically positioned in the macro block for which the intra coding is performed in the (N−1)th frame.

22. A moving image coding method according to claim 1, wherein
motion information of a target area for which intra coding is performed is provided in (N−1)th frame;
intra coding is performed, in Nth frame, for a macro block identically positioned in a macro block which is predicted to be the target area in Nth frame; and
inter coding is performed, in Nth frame, for a macro block in the periphery of the macro block.

23. A moving image coding method according to claim 1, wherein
in a case of coding a moving image in which image frame is configured by macro blocks which number is equal to or less than the maximum number of inter-coded macro blocks, macro blocks of a reference image are generated for all positions of a macro block and are stored in the reference image memory; and
in a case of coding a moving image in which image frame is configured by macro blocks which number exceeds the maximum number of inter-coded macro blocks, macro blocks of a reference image are generated for only position of a macro block which is determined to be performed inter coding and are stored in the reference image memory.

24. A moving image coding method according to claim 1, wherein
a frequency of inter coding is held every position of macro blocks; and
in starting, inter coding is performed for macro blocks from a macro block positioned where a frequency of inter coding is more in order.

25. A moving image coding method according to claim 24, wherein
it is selected whether the frequency of inter coding is held or not and whether inter coding is previously performed from a macro block positioned where a frequency of inter coding is more in order or not.

26. A moving image coding method according to claim 1, wherein
in a case a sum of code quantity of all macro blocks which are inter-coded in (N−1)th frame exceeds a predetermined threshold for detecting scene change, intra coding is performed for all macro block in the Nth frame.

27. A moving image coding apparatus provided with encoding means for encoding a moving image using intra coding or inter coding for each macro block which is a part of a present image, wherein, in intra coding, image data are orthogonal-transformed, then image data after the orthogonal-transformation are quantized and variable-length coded, and wherein, in inter coding, a motion vector of the present image relative to a reference image is detected, motion compensation for the reference image using the motion vector is performed, differential data between the present image and the reference image after the motion compensation are orthogonal-transformed, then differential data after the orthogonal transformation are quantized and variable-length coded, and
a reference image memory for storing, for purpose of the inter coding, a reference image of image frame next to the present image generated by reverse-quantizing and reverse-orthogonal-transforming image data after the quantization or differential data after the quantization, comprising:
setting means for setting a maximum number of macro books that are inter-coded being a value smaller than the number of macro blocks configuring an image frame so as to reduce the capacity of a reference image memory; and
determining means for determining position of a macro block which is intra-coded or inter-coded so as that the number of macro blocks which are inter-coded are within a range of the maximum number of macro blocks inter-coded in one image frame when an image which corresponds to Mth frame, wherein M≦N−1, prior to a present image which corresponds to Nth frame is coded,
wherein the capacity of the reference image memory is smaller than a size of the number of macro blocks configuring an image frame.

28. A moving image coding apparatus according to claim 27, wherein
the macro blocks which are inter coded are arranged in a staggered format.

29. A moving image coding apparatus according to claim 27, wherein
the macro blocks which are inter coded are arranged in a lattice format.

30. A moving image coding apparatus provided with encoding means for encoding a moving image, every macro block which forms a predetermined area of a present image, with using intra coding for in which image data are orthogonal-transformed, and then image data after the orthogonal transformation are quantized and variable-length coded, and inter coding in which a motion vector of the present image relative to a reference image is detected, motion compensation for the reference image with using the motion vector is performed, differential data between the present image and the reference image after the motion compensation are orthogonal-transformed, and then differential data after the orthogonal transformation are quantized and variable-length coded, and a reference image memory for storing, for purpose of the inter coding, a reference image of image frame next to the present image generated by inverse-quantizing and inverse-orthogonal-transforming image data after the quantization or differential data after the quantization, comprising:

determining means for determining position of a macro block which is intra-coded or inter-coded in a range of the maximum number of macro blocks which is inter-coded in one image frame when an image (Mth frame, $M \leq N-1$) prior to a present image (Nth frame) is coded.

31. A moving image coding apparatus according to claim 30, wherein the reference image memory stores macro blocks in a reference image of the next image frame, for only position of which is determined to perform the inter coding.

32. A moving image coding apparatus according to claim 30, wherein the reference image memory has smaller capacity than capacity required to store a reference image for all macro blocks configuring an image frame.

33. A moving image coding apparatus according to claim 30, comprising:

address management means for managing position of a macro block in a reference image stored in the reference image memory in correspondence with an address of the reference image memory.

34. A moving image coding apparatus according to claim 30, comprising:

macro block number counting means for counting the number of macro blocks in a reference image stored in the reference image memory.

35. A moving image coding apparatus according to claim 34, wherein in a case the number of macro blocks stored in the reference image memory is equal to the maximum number of macro blocks for which inter coding is performed, the determining means determines to intra code for a macro block, which is positioned in a subsequent macro block, in the next image frame.

36. A moving image coding apparatus according to claim 30, comprising:

function value calculating means for calculating evaluation function value based upon difference between a macro block identically positioned in a macro block for which inter coding is performed and a macro block in a reference image stored in the reference image memory.

37. A moving image coding apparatus according to claim 36, wherein the determining means performs intra coding for a macro block identically positioned in the macro block for which the inter coding is performed in a next image frame, in a case the evaluation function value is larger than a predetermined threshold.

38. A moving image coding apparatus according to claim 30, comprising:

inter coding frequency counting means for counting a frequency of continuous inter coding in each position of a macro block.

39. A moving image coding apparatus according to claim 38, wherein the determining means performs intra coding for a macro block positioned where the frequency of continuous inter coding is equal to a predetermined threshold in the next image frame.

40. A moving image coding apparatus according to claim 30, comprising:

intra coding frequency counting means for counting a frequency of continuous intra coding in each position of a macro block.

41. A moving image coding apparatus according to claim 40, wherein the determining means performs inter coding for a macro block positioned where the frequency of continuous intra coding is equal to a predetermined threshold in the next image frame, in a case the number of macro blocks stored in the reference image memory is smaller than the maximum number of macro blocks which can be stored in the reference image memory.

42. A moving image coding apparatus according to claim 30, wherein the coding means performs inter coding for a macro block adjacent to all or over-predetermined number of a macro block which is intra-coded with zero as the motion vector.

43. A semiconductor integrated circuit, comprising the moving image coding apparatus according to claim 30.

* * * * *